United States Patent
Takama et al.

(10) Patent No.: US 8,269,748 B2
(45) Date of Patent: Sep. 18, 2012

(54) DISPLAY AND ELECTRONIC APPARATUS

(75) Inventors: Daisuke Takama, Kanagawa (JP); Kenta Seki, Kanagawa (JP)

(73) Assignee: Sony Corporation, Tokyo (JP)

( * ) Notice: Subject to any disclaimer, the term of this patent is extended or adjusted under 35 U.S.C. 154(b) by 731 days.

(21) Appl. No.: 12/329,812

(22) Filed: Dec. 8, 2008

(65) Prior Publication Data

US 2009/0146946 A1    Jun. 11, 2009

(30) Foreign Application Priority Data

Dec. 7, 2007 (JP) ................................. 2007-317704
Sep. 22, 2008 (JP) ................................. 2008-242785

(51) Int. Cl.
*G06F 3/042* (2006.01)

(52) U.S. Cl. ........................................ 345/175; 345/104

(58) Field of Classification Search ........................ None
See application file for complete search history.

(56) References Cited

U.S. PATENT DOCUMENTS 7,924,272 B2 * 4/2011 Boer et al. ................... 345/175
2004/0017364 A1 * 1/2004 Tanaka et al. ................ 345/173
2006/0192766 A1   8/2006 Nakamura et al.
2007/0091074 A1 * 4/2007 Nashiki et al. ............... 345/173

FOREIGN PATENT DOCUMENTS

| JP | 11-134105    | 5/1999  |
| JP | 2002-041244  | 2/2002  |
| JP | 2002-149085  | 5/2002  |
| JP | 2004-318067  | 11/2004 |
| JP | 2004-318819  | 11/2004 |

\* cited by examiner

*Primary Examiner* — Wayne Young
*Assistant Examiner* — Brian Butcher
(74) *Attorney, Agent, or Firm* — K&L Gates LLP

(57) ABSTRACT

A display is provided. The display includes at least one display cell having a display circuit; at least one light receiving cell including a light receiving element; a light emitting section operative to radiate light to the side of a display surface; and at least one transparent plate disposed on the front side in the display relative to a region in which the light emitting section is disposed and regions in which the display cell and the light receiving cell are formed, wherein an antireflection layer is formed on a most face-side surface of the display.

18 Claims, 40 Drawing Sheets nL < npol

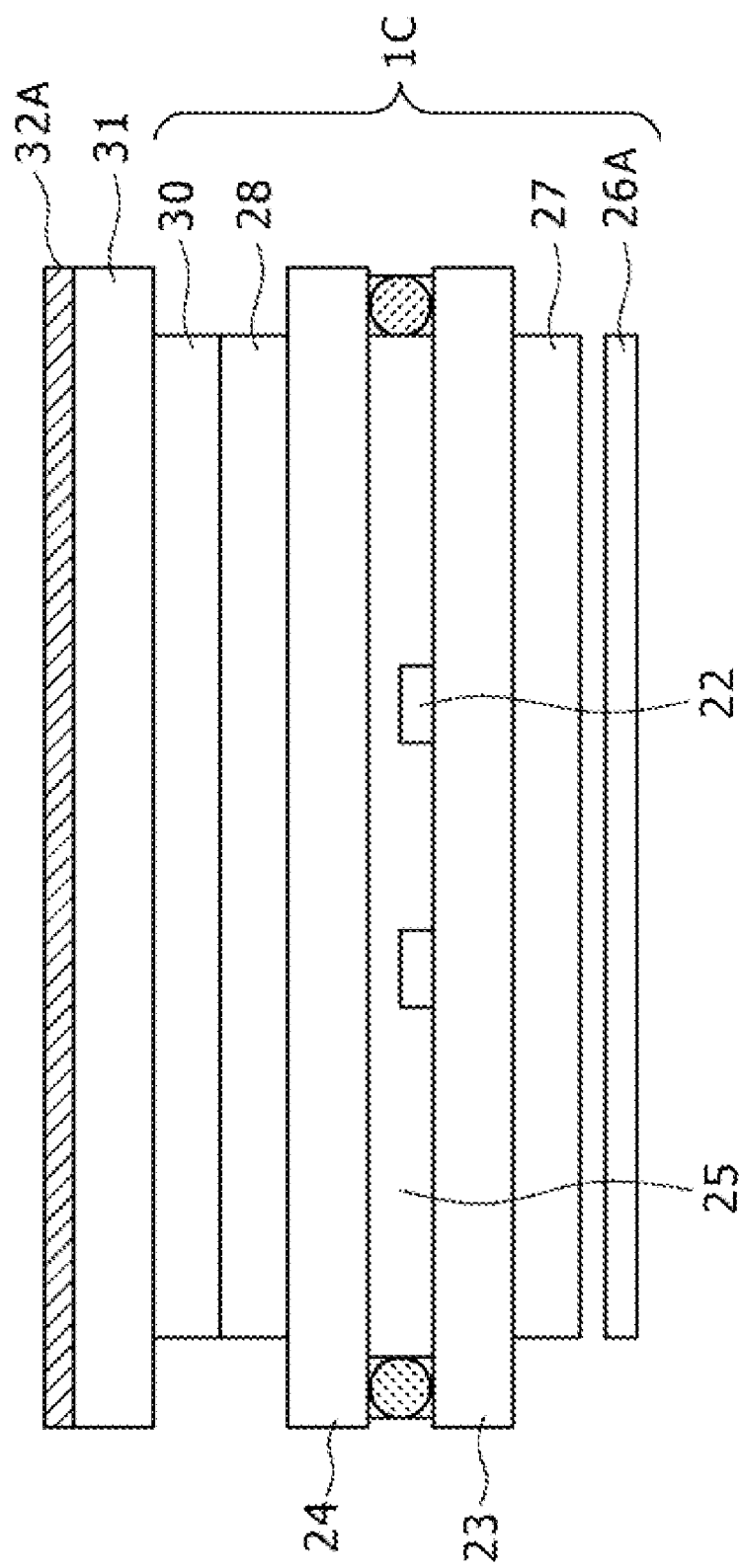

nL < n cover

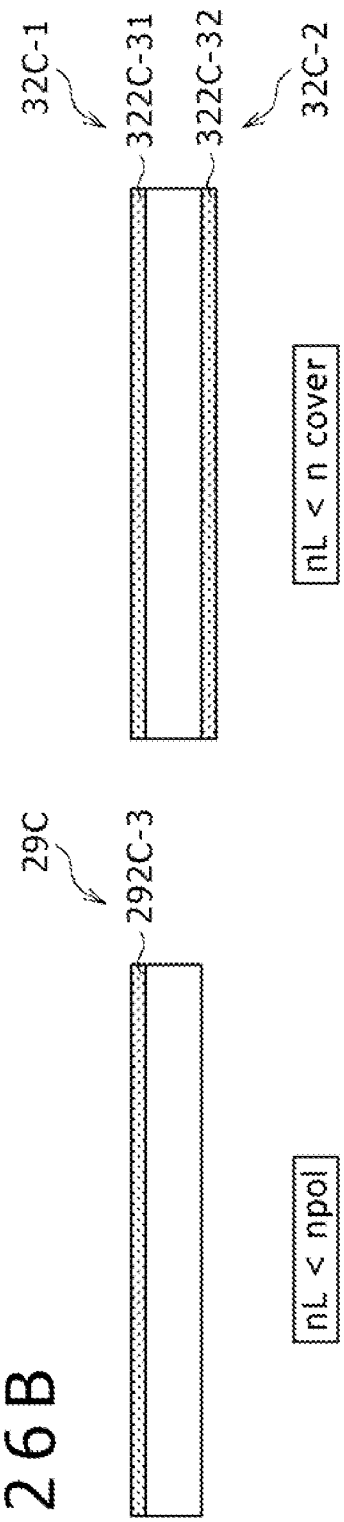
FIG. 26A
FIG. 26B

WAVELENGTH (nm)

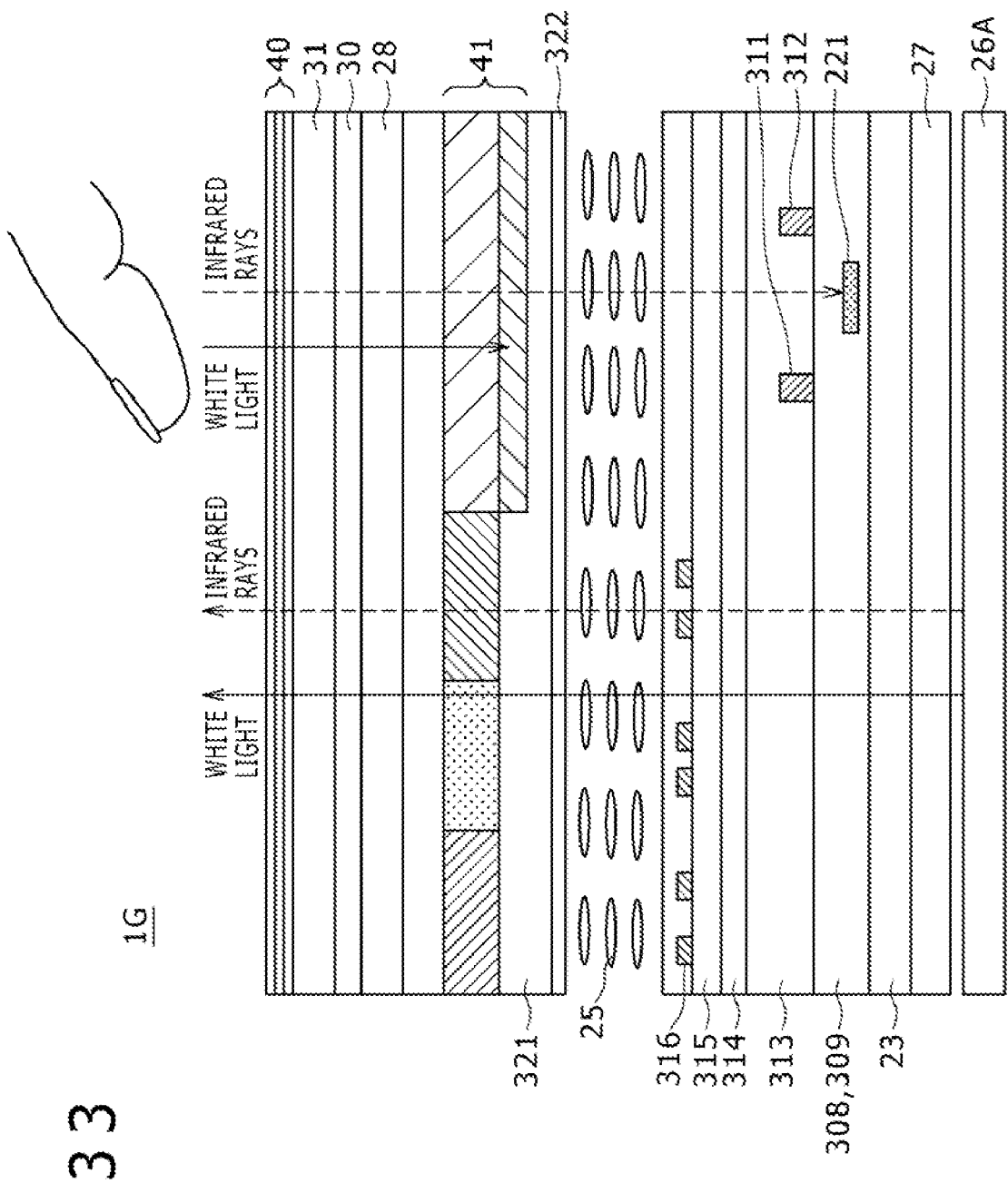

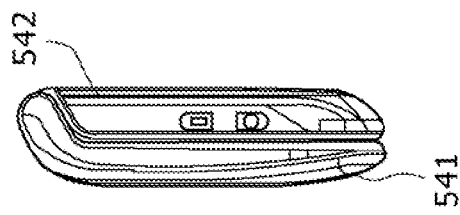
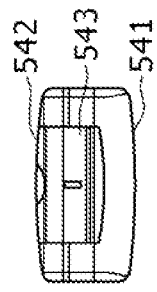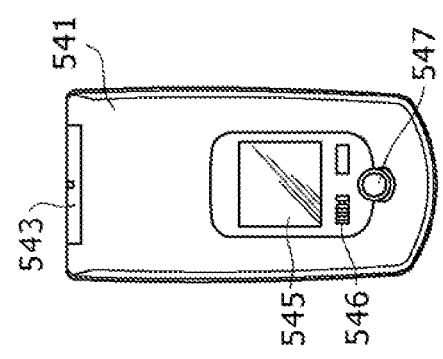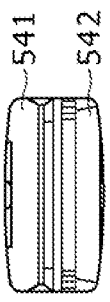
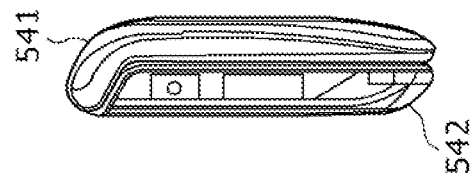
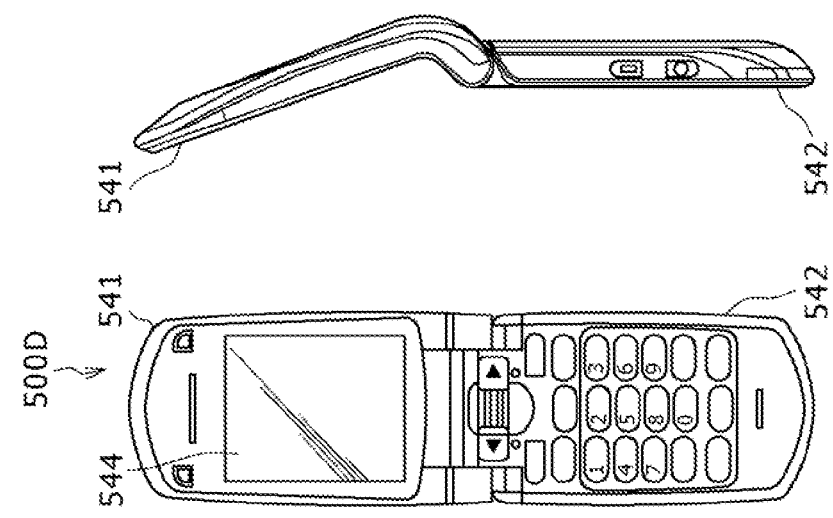

DISPLAY AND ELECTRONIC APPARATUS

CROSS REFERENCES TO RELATED APPLICATIONS

The present application claims priority to Japanese Patent Applications JP 2007-317704 and JP 2008-242785, filed in the Japan Patent Office on Dec. 7, 2007 and Sep. 22, 2008, respectively, the entire contents of which are being incorporated herein by reference.

BACKGROUND

The present application relates to a display provided with light emitting elements in a display pixel section or on an architrave-like frame thereof.

There have been proposed several technologies in which a display itself is provided with a function for inputting of coordinates.

Specifically, for example, a display of the pressure-sensitive type touch panel system (refer to Japanese Patent Laid-Open No. 2002-149085 and Japanese Patent Laid-Open No. 2002-41244), a display of the electromagnetic induction type touch panel system (refer to Japanese Patent Laid-Open No. Hei 11-134105) and the like have been known.

However, the displays provided with such a coordinate inputting function as above-mentioned are difficult to downsize, and are higher in cost than the ordinary displays.

In order to solve these problems, development has been vigorously made of displays in which each pixel is provided with a light receiving element and the coordinates in the display are specified by detection of light incident on the light receiving elements (refer to Japanese Patent Laid-Open No. 2004-318067 and Japanese Patent Laid-Open No. 2004-318819).

The display thus provided with the light receiving elements to enable inputting of coordinates in the display can be advantageously reduced in size and cost, as compared with the displays provided with the coordinate inputting function, and has a further advantage in that multi-point coordinate inputting and area inputting are possible.

Thus, recently, development of a liquid crystal display device having also a photo-sensor element in each pixel has been in progress. For example, with a photo-sensor element provided in each pixel, it is possible to realize a scanner function and a touch panel function with a normal liquid crystal module structure.

For instance, a touch panel functioned LCD (Liquid Crystal Display) module provided with a photo-sensor in each pixel has been reported and demonstrated in Session 24 of SID 2007.

Such a technology of incorporating photo-sensor elements in a liquid crystal display device is indispensable to user interfacing of displays in the future, and is one of the promising technologies.

SUMMARY

Meanwhile, in recent years, a movement toward protection of an LCD surface with a transparent substrate, such as an acrylic resin plate and a glass substrate, so as to achieve an improvement in strength or design has been seen in digital cameras and mobile phones.

However, when an acrylic resin plate is disposed on a photosensor-incorporating LCD, the reflected light generated at the surface of the acrylic resin plate would constitute noise, thereby lowering the sensitivity of the photo-sensors.

In addition to the reflection from the acrylic resin plate, there is also the problem that the back-light light (the light emitted from a back light) is reflected at the most face-side surface of the LCD, and the reflected light would be incident on the photo-sensors so as to serve as noise, thereby lowering the S/N (Signal to Noise) of the photo-sensors.

The main cause of the optical noises is the reflection at the interface between the most face-side surface of the display and the air.

Besides, where a protective cover is disposed on the front side of a display, the outgoing light from the display is reflected by the protective cover, and the reflected light would be incident on the photo-sensors formed inside the display, to increase the noise, thereby further lowering the S/N of the photo-sensors.

Thus, there is a need for a display and an electronic apparatus such that the reflected light generated from the most face-side surface of the display or a protective cover can be eliminated, the influence of noise can be reduced, and the S/N of a light receiving system can be improved.

According to an embodiment, there is provided a display including: at least one display cell having a display circuit; at least one light receiving cell including a light receiving element; a light emitting section operative to radiate light to the side of a display surface; and at least one transparent plate disposed on the front side in the display relative to a region in which the light emitting section is disposed and regions in which the display cell and the light receiving cell are formed, wherein an antireflection layer is formed on a most face-side surface of the display.

In an embodiment, the display further includes a protective transparent substrate disposed on the further front side of the transparent plate, with an air layer therebetween, and the antireflection layer is provided on the most face-side surface of the display and on at least one of a front-side surface and a back-side surface of the protective transparent substrate.

In an embodiment, the display further includes a protective transparent substrate disposed on the further front side of the transparent plate, with a filler layer therebetween, and the antireflection layer is formed at the interface between the protective transparent plate and an air layer.

In an embodiment, the antireflection layer has a function of preventing reflection of light in a wavelength region in which the spectrum of the light emitting section is present.

According to an embodiment, there is provided a display including: at least one display cell having a display circuit; at least one light receiving cell including a light receiving element; a back light operative to illuminate a display surface at a predetermined luminance; a first transparent substrate provided with the display cell and the light receiving element; a second transparent substrate disposed opposite to the first transparent substrate; a liquid crystal layer disposed between the first transparent substrate and the second transparent substrate; a first polarizing plate formed on a surface, opposed to the back light, of the first transparent substrate; and a second polarizing plate formed on the front side of the second transparent substrate, wherein an antireflection layer is formed on the second polarizing plate constituting a most face-side surface of the display.

According to an embodiment, there is provided an electronic apparatus including a display, the display including: at least one display cell having a display circuit; at least one light receiving cell including a light receiving element; a light emitting section operative to illuminate the side of a display surface; and at least one transparent plate disposed on the front side in the display relative to a region in which the light emitting section is disposed and regions in which the display cell and the light receiving cell are formed, wherein an antireflection layer is formed on a most face-side surface of the display.

According to an embodiment, there is provided an electronic apparatus including a display, the display including: at least one display cell having a display circuit; at least one light emitting section including a light emitting element; a back light operative to illuminate a display surface at a predetermined luminance; a first transparent substrate provided with the display cell and the light emitting element; a second transparent substrate disposed opposite to the first transparent substrate; a liquid crystal layer disposed between the first transparent substrate and the second transparent substrate; a first polarizing plate formed on a surface, opposed to the back light, of the first transparent substrate; and a second polarizing plate formed on the front side of the second transparent substrate, wherein an antireflection layer is formed on the second polarizing plate constituting a most face-side surface of the display.

In an embodiment, the light from the light emitting section, for example, enters the antireflection layer, but the reflected light from the most face-side surface of the display is eliminated because the antireflection layer has undergone or embodies an antireflection treatment optimized for the wavelength region of the incident light.

Consequently, the influence of noise on the photo-sensors can be reduced, and the S/N of the light receiving system is improved.

According to an embodiment, the reflected light from the most face-side surface of the display and from a protective cover disposed on the front side thereof can be eliminated. As a result, the influence of noise can be reduced, and the S/N of the light receiving system can be improved.

Additional features and advantages are described herein, and will be apparent from the following Detailed Description and the figures.

BRIEF DESCRIPTION OF THE FIGURES

FIG. 18 is a simplified sectional view of a light receiving cell part according to a fourth embodiment;

FIGS. 26A and 26B illustrate the configuration and production process of an antireflection layer according to the sixth embodiment;

FIG. 33 is a sectional view of a light receiving cell part according to an eighth embodiment;

FIGS. 41A to 41G illustrate a portable terminal device, for example, a mobile phone according to an embodiment;

DETAILED DESCRIPTION

The present application will be described below referring to the attached drawings according to an embodiment.

To begin, the basic configuration and functions of a liquid crystal image display having light receiving elements on the basis of each display pixel will be described, and thereafter the embodiments pertaining to specific structures will be described.

Figure 1:
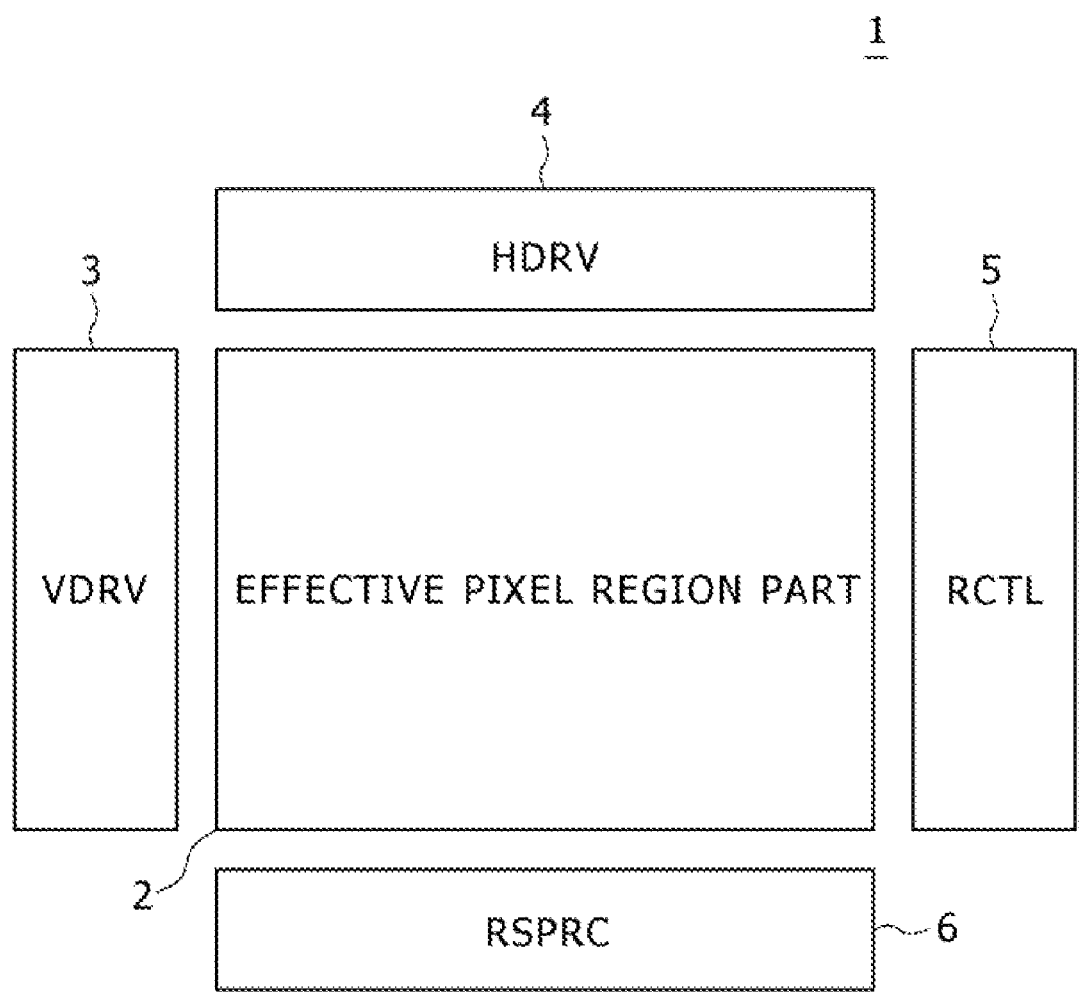
FIG. 1 is a block diagram showing a configuration example of a liquid crystal display according to an embodiment of the present application.

FIG. 1 is a block diagram showing a configuration example of a liquid crystal display according to an embodiment.

Figure 2:
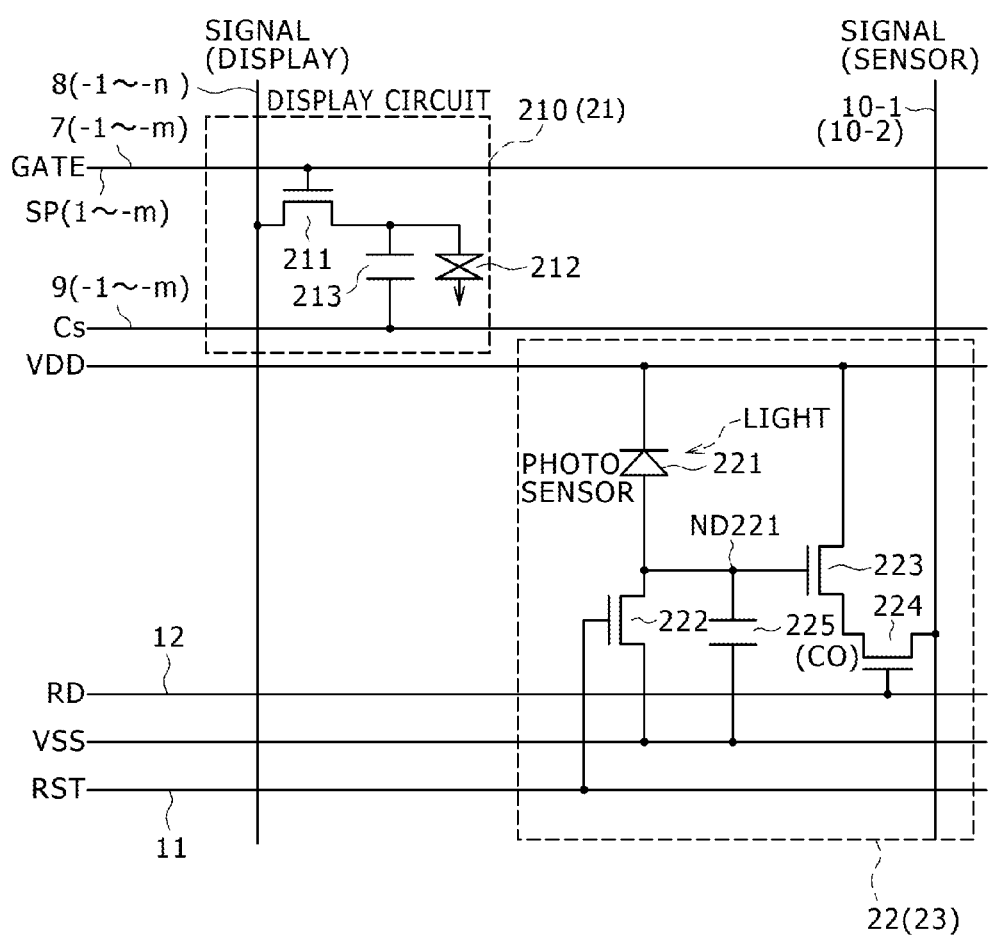
FIG. 2 is a circuit diagram showing a configuration example of a display cell and a light receiving cell according to an embodiment.

FIG. 2 is a circuit diagram showing a basic configuration example of a display cell and a light receiving cell according to an embodiment. In FIG. 2, the display cell and the light receiving cell are presented adjacently.

As shown in FIG. 1, the liquid crystal image display 1 includes an effective pixel region part 2, a vertical driving circuit (VDRV) 3, a horizontal driving circuit (HDRV) 4, a light reception control circuit (RCTL) 5, and a light reception signal processing circuit (RSPRC) 6.

The effective pixel region part 2 has arranged therein a plurality of display cells 21 inclusive of display circuits 210 forming the display pixels.

In addition, light receiving cells 22 are arranged in the effective pixel region part 2 or a region adjacent thereto. As for arrangement of the light receiving cells 22, one light receiving cell may be arranged for a plurality of pixels, or one light receiving cell may be arranged for each of RGB in the pixel, or one light receiving cell may be arranged for each pixel.

No special remark is to be made in regard of the layout of the light receiving elements in the display in the case of applying the present application.

With the present application thus applied to the display in which the light receiving cells are incorporated, light reception signals with little influence of noise can be used in the subsequent processing steps, and light reception (imaging) can be performed while preventing displaying-side signals from mixing into imaging-side signals.

In the present embodiment, basically, an antireflection layer is disposed on a most face-side surface of the display, whereby reflected light from the most face-side surface of the display and from a protective cover disposed on the front side can be eliminated, and the S/N of photo-sensors can be improved.

The device structure will be described in detail later.

As shown in FIG. 2, the display circuit 210 in each display cell 21 has a thin film transistor (TFT) 211 as a switching element, a liquid crystal cell (LC) 212, and a holding capacitance (Cs) 213.

The liquid crystal cell (LC) 212 has a pixel electrode, which is connected to a drain electrode (or source electrode) of the TFT 211. Of the holding capacitance (Cs) 213, one electrode is connected to the drain electrode of the TFT 211.

For each of the display cells 21, scanning lines (gate lines) 7-1 to 7-$m$ are laid on a row basis along the pixel array direction, whereas signal lines 8-1 to 8-$n$ are laid on a column basis along the pixel array direction.

The gate electrodes of the TFTs 211 of the display cells 21 are connected to the same one of the scanning lines (gate lines) 7-1 to 7-$m$ on a row basis. In addition, the source electrodes (or drain electrodes) of the TFTs 211 of the display cells 21 are connected to the same one of the display signal lines 8-1 to 8-$n$ on a column basis.

In the configuration of FIG. 2, the scanning lines 7-1 to 7-$m$ are connected to the vertical driving circuit 3, and are driven by the vertical driving circuit 3.

Besides, the display signal lines 8-1 to 8-$n$ laid correspondingly to the display cells 21 are connected to the horizontal driving circuit 4, and are driven by the horizontal driving circuit 4.

Further, in a general liquid crystal display, pixel holding capacitance wirings (Cs) 9-1 to 9-$m$ are laid independently, and the holding capacitances 213 are formed between the pixel holding capacitance wirings 9-1 to 9-$m$ and connection electrodes.

In the display cell 21 in each pixel part 20, an opposite electrode of the liquid crystal cell 212 and/or the other electrode of the holding capacitance 213 is supplied with a predetermined DC voltage as a common voltage VCOM through a common wiring.

Or, alternatively, the opposite electrode of the liquid crystal cell 212 and the other electrode of the holding capacitance 213, in each display cell 21, are supplied with a common voltage VCOM of which the polarity is reversed on the basis of one horizontal scanning period (1H).

In addition, in the effective pixel region part 2, light reception signal lines 10 are laid correspondingly to the light receiving cells 22.

The light reception signal lines 10 are connected to the light reception signal processing circuit 6 so as to transfer a signal, which is read under the control of the light reception control circuit 5, to the light reception signal processing circuit 6.

Supplied with a vertical start signal VST, a vertical clock signal VCK and an enable signal ENB, the vertical driving circuit 3 performs a process of scanning in the vertical direction (column direction) on the basis of one field period so as to sequentially select, on a row basis, the display cells 21 connected to the scanning lines 7-1 to 7-$m$.

More specifically, when a scanning pulse SP1 is given from the vertical driving circuit 3 to the scanning line 7-1, the pixels in the columns in the first row are selected, and, when a scanning pulse SP2 is given to the scanning line 7-2, the pixels in the columns in the second row are selected. Similarly then on, scanning pulses SP3, . . . , SPm are sequentially given to scanning lines 7-3, . . . , 7-$m$.

Supplied with a horizontal start pulse HST for commanding the start of horizontal scanning and horizontal clocks HCK in mutually reverse phases to be a reference of horizontal scanning, which are generated by a clock generator (not shown), the horizontal driving circuit 4 generates sampling pulses.

The horizontal driving circuit 4 sequentially samples inputted image data R (red), G (green) and B (blue) in response to the sampling pulses generated, and supplies the display signal lines 8-1 to 8-*n* with the sampled data as data signals to be written into the display cells 21.

In addition, first light receiving cell control lines (reset signal lines) 11 and second light receiving cell control lines (reading signal lines) 12 are laid along the pixel array direction, for the light receiving cells 22.

Besides, the light receiving cells 22 are connected to a power source potential source VDD and a reference potential source VSS.

As shown in FIG. 2, the light receiving cell 22 in the present embodiment has a light receiving element 221, a reset TFT 222, an amplifying TFT 223, a selecting (reading) TFT 224, a light reception signal storage capacitance (capacitor) 225, and a node ND221.

The light receiving element 221 is formed by use of a TFT, a diode or the like.

In addition, a reading circuit 220 (230) of the light receiving cell 22 has the reset TFT 222, the amplifying TFT 223, the selecting (reading) TFT 224, a capacitor 225, and the node ND221.

The light receiving element 221 is connected between the power source potential source VDD and the node ND221. The reset TFT 222 is formed by use of an n-channel transistor, for example, and its source is connected to the reference potential source VSS (for example, a ground GND), while its drain is connected to the node ND221. Besides, the gate electrode of the reset TFT is connected to the first light reception control line 11 wired in the corresponding row.

Of the amplifying TFT 223, the gate is connected to the node ND221, the drain is connected to the power source potential source VDD, and the source is connected to the drain of the selecting TFT 224. Of the selecting TFT 224, the gate is connected to the second light reception control line 12, and the source is connected to the light reception signal line 10 wired in the corresponding column.

The amplifying TFT 223 and the selecting TFT 224 constitute a so-called source follower. Therefore, a current source is connected to the light reception signal line 10. The current source, in the present embodiment, is formed in the light reception signal processing circuit 6, for example.

Besides, the capacitor (light reception signal storage capacitance) 225 is connected between the node ND221 and the reference potential source VSS.

The first light receiving cell control line 11 and the second light receiving cell control line 12 are connected to the light reception control circuit 5.

The light reception control circuit 5 impresses a reset pulse RST on the first light receiving cell control line 11 at a predetermined timing.

This results in that the reset TFT 222 of the light receiving cell 22 is kept ON for a predetermined period, and the node ND221 is reset. In other words, the light receiving cell 22 is so operated that the electric charge in the light reception signal storage capacitance connected to the node ND221, for example, is discharged, whereby the potential of the node ND221 is set to a reference voltage, and the light receiving cell 22 is put into an initial state.

When a predetermined amount of light is received by the light receiving element 221 in this condition, the light receiving element 221 comes to conduct, whereby the potential of the node ND221 is raised, and an electric charge is stored in the capacitor (light reception signal storage capacitance) 225.

In this instance, a reading signal RD is impressed on the second light receiving cell control line 12 at a high level by the light reception control circuit 5, whereby the selecting TFT 224 is held in an ON state. This results in that the electric charge accumulated in the capacitor 225 is amplified as an electrical signal by the amplifying TFT 223, and the amplified signal is outputted as a light reception signal to the light reception signal wiring 10 through the selecting TFT 224.

Then, the signal transferred through the light reception signal wiring 10 is inputted to the light reception signal processing circuit 6.

The light reception signal processing circuit 6 performs a noise removing process, for example, by processing a difference signal between a signal generated by the light receiving cell 22 and a signal generated by a reference cell (not shown) which is arranged separately. After performing the noise removing process, the light reception signal processing circuit 6 outputs a signal to a signal processing system (not shown) on the subsequent stage for controlling a predetermined functional section in response to the reception signal inputted to the light receiving cell 22.

Figure 3:
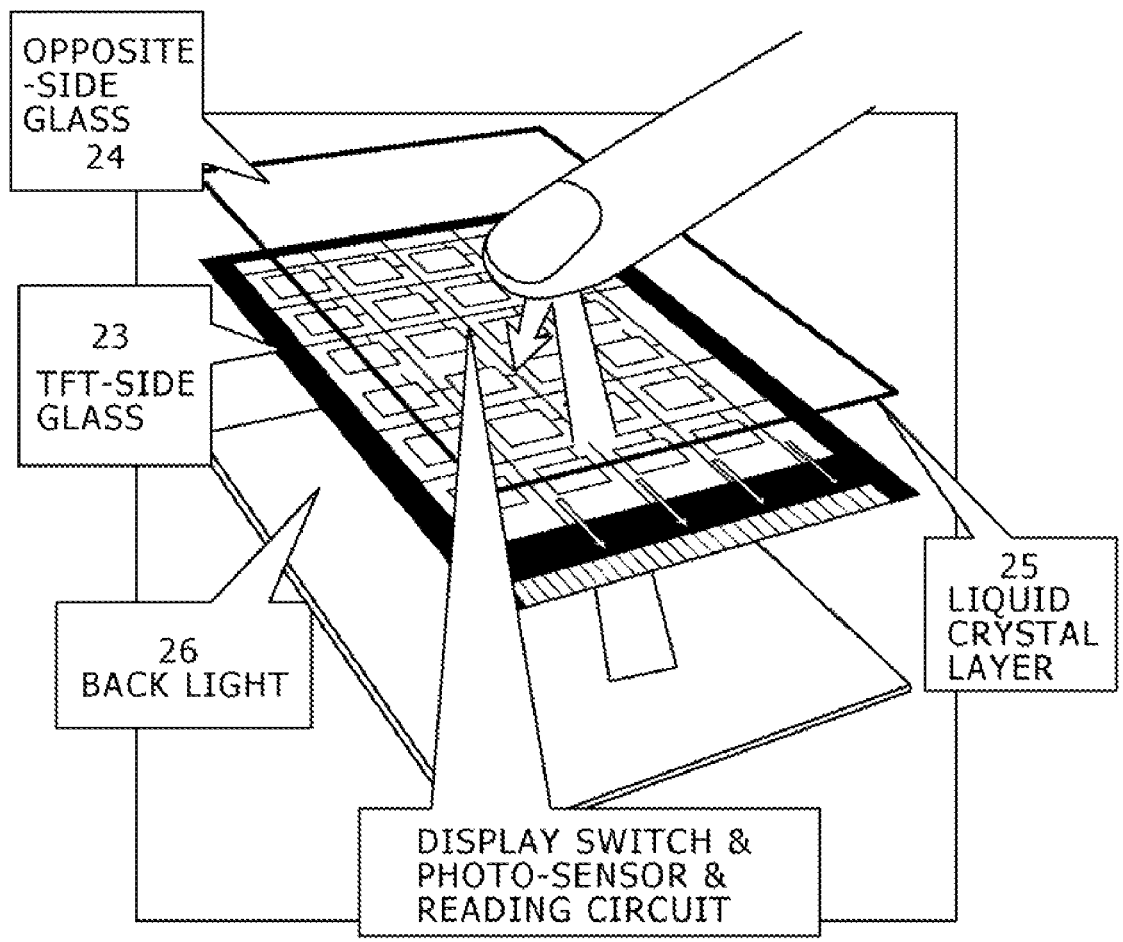
FIG. 3 is a schematic illustration of a system for detecting the light emitted from a back light and reflected.

Incidentally, in the present embodiment, a case where a detection system for realizing a touch panel image sensor or the like by utilizing the reflected light generated by reflection of the back-light light at an object to be detected, as shown in FIG. 3, will be described as an example.

In the present embodiment, the photosensor-incorporating, inputting function-provided type display configured as above has a basic configuration in which an antireflection layer is formed on the most face-side surface of the display.

The antireflection layer is capable of preventing reflection of light in a wavelength region in which the spectrum of a back-light light source is present.

In addition, where a protective cover is disposed on the front side of the display, with an air layer therebetween, an antireflection layer is formed on the most face-side surface of the display and at least one-side surface of the protective cover.

In this case, also, the antireflection layer is capable of preventing reflection of light in a wavelength region in which the spectrum of a back-light light source is present. Besides, where the protective cover and the display are adhered to each other through a filler layer interposed on the front side of the display, an antireflection layer is formed on the most face-side surface of the protective cover.

In this case, also, the antireflection layer is capable of preventing reflection of light in a wavelength region in which the spectrum of a back-light light source is present.

In addition, in the case where infrared rays are used as the detection light, infrared rays other than those in the wavelength band of the infrared rays emitted from the display constitute noise. In the present embodiment, therefore, a configuration for preventing the incidence of light in a wavelength region in which the spectrum of the light emitting section is absent is adopted.

By preventing the incidence of light in the wavelength region in which the spectrum of the light emitting section is absent, external light resistance characteristic (operable environment) can be broadened.

As will be described in detail later, in the present embodiment, a filter operative to "prevent incidence of light in a wavelength region in which the spectrum of detection light used for detection, of the light emitted from the light emitting section, is absent" is disposed in the display. The fitter, for example, is disposed at an upper part of the light receiving element 221, and is formed as a visible light cutting filter. In addition, if for example the filter has such a characteristic as to selectively transmit the light in the wavelength band of infrared rays which is used as the detection light, the filter may be so configured as to prevent also the incidence on the light receiving element 221 of light coming from other areas than the light emitting section. Besides, the filter has such a characteristic as to attenuate the incident light in a wavelength region in which the spectrum of the detection light is absent, as compared with the incident light in the wavelength region of the detection light, thereby preventing the incidence on the light receiving element 221 of the light in the wavelength region in which the spectrum of the detection light is absent.

Now, embodiments of a specific device structure of a LCD module will be described below.

First Embodiment

Figure 4:
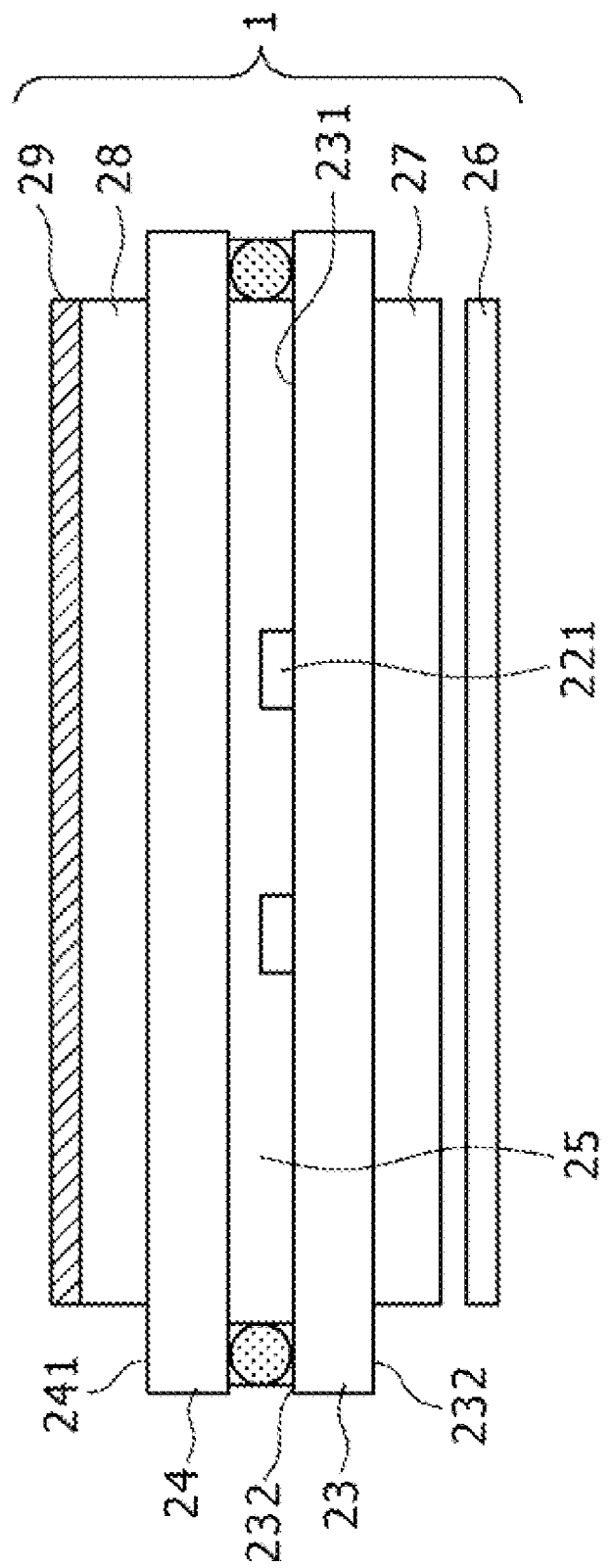
FIG. 4 is a simplified sectional view of a light receiving cell part according to an embodiment.

FIG. 4 is a simplified sectional view of a light receiving cell part according to a first embodiment.

As shown in FIG. 4, the light receiving cell 22 is formed on the substrate surface 231 side of a TFT substrate 23 formed by use of a transparent insulating substrate (for example, a glass substrate). The light receiving cell 22 includes a reading circuit and a light receiving element (photo-sensor) 221, as above-mentioned.

A liquid crystal layer 25 is sealed between the TFT substrate 23 and an opposite substrate 24 formed by use of an opposite transparent insulating substrate (for example, a glass substrate). In addition, a back light 26 is disposed on the bottom surface 232 side of the TFT substrate 23, for example.

Besides, a first polarizing plate 27 on the back side (lower side) is formed on the bottom surface 232 of the TFT substrate 23, whereas a second polarizing plate 28 on the front side (upper side) is formed on a front surface 241 of the opposite substrate 24.

An antireflection layer 29 is formed on the front side of the second polarizing plate 28 on the front side (upper side).

The light receiving element (photo-sensor) 221 and the like are formed, for example, by use of LTPS (low-temperature poly-silicon).

Figure 5:
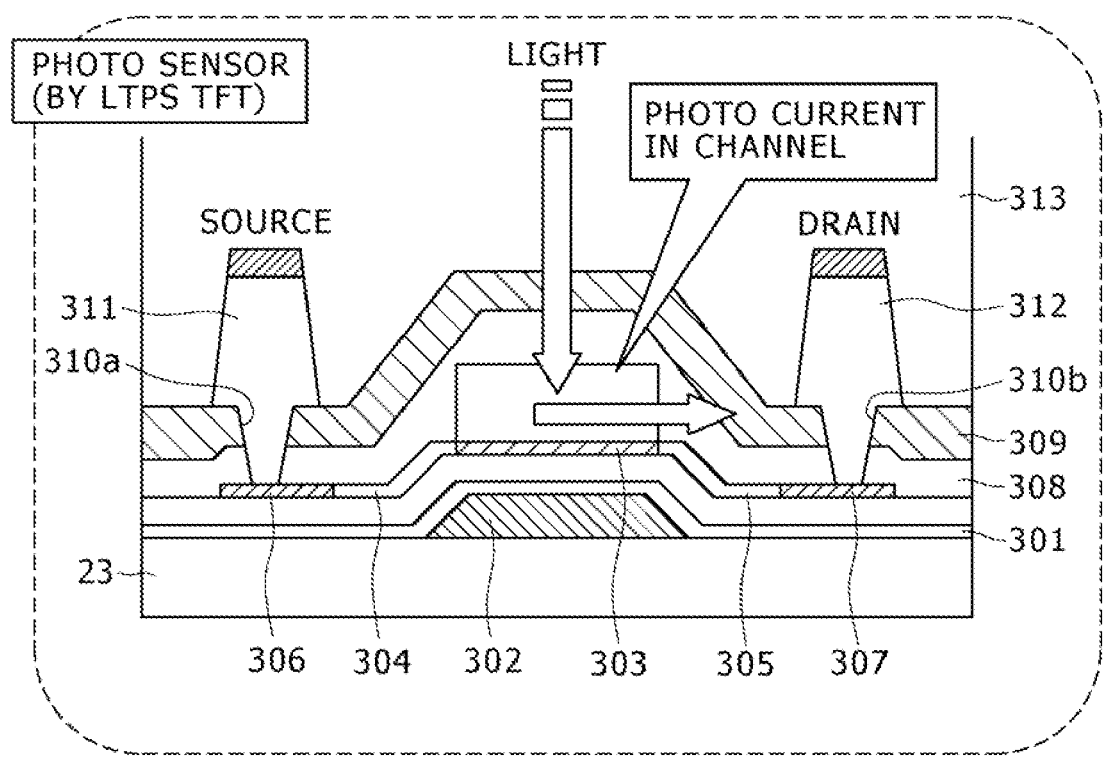
FIG. 5 is a sectional view showing a configuration example in which a photo-sensor (light receiving element) is formed by use of a TFT (Thin Film Transistor)

FIG. 5 is a sectional view showing a configuration example in which the photo-sensor (light receiving element) in the light receiving cell is formed by use of a TFT.

A gate electrode 302 covered with a gate insulator film 301 is formed on a TFT substrate 23 formed by use of a transparent insulating substrate, for example, a glass substrate. The gate electrode 302 is formed, for example, by a method in which a film of a metal, such as molybdenum (Mo) and tantalum (Ta), or an alloy thereof is formed by sputtering or the like.

Over the gate insulator film 301, there are formed a semiconductor film (channel forming region) 303, a pair of n⁻ diffusion layers (LDD regions) 304, 305 on opposite sides of the semiconductor film 303, and a pair of n⁺ diffusion layers 306, 307 (source and drain regions) on opposite sides of the semiconductor film 303.

Further, an inter-layer insulation film 308 is formed so as to cover the gate insulator film 301, the semiconductor film (channel forming region) 303, the n⁻ diffusion layers (LDD regions) 304, 305, and the n⁺ diffusion layers 306, 307 (source and drain regions). Furthermore, an inter-layer insulation film 309 is formed so as to cover the inter-layer insulation film 308. The inter-layer insulation film 309 is formed, for example, from SiN, $SiO_2$ or the like.

A source electrode 311 is connected to the n⁺ diffusion layer 306 on one side through a contact hole 310a formed in the inter-layer insulation films 308, 309. A drain electrode 312 is connected to the n⁺ diffusion layer 307 on the other side through a contact hole 310b formed in the inter-layer insulation films 308, 309.

The source electrode 311 and the drain electrode 312 are formed, for example, by patterning of aluminum (Al).

A flattening film 313 is formed over the inter-layer insulation film 309, the source electrode 311, the drain electrode 312, and the inter-layer insulation film 309.

Then, a liquid crystal layer 25 is formed on the flattening film 313.

In this configuration, the gate electrode of a bottom gate type TFT is formed on an optical path through which backlight light is conducted to the channel region of the TFT. Therefore, the TFT gate electrode has a function of intercepting the light coming from the back light and, hence, a function of reducing noise light.

While an example in which a light leak effect of the TFT is utilized as the photo-sensor is shown here, the photo-sensor is not limited to the poly-silicon TFT, and may be an amorphous-silicon TFT, a micro-silicon TFT or the like. Besides, the device configuration is not limited to PIN; in other words, the concept of the present embodiment is applicable also to other device configurations exhibiting the same effect as above-mentioned, for example, PD, PDN (Photo sensitive doped layer: P-doped-N), etc. Further, the TFT may be of the top gate type or of the bottom gate type.

Now, the function of eliminating the reflected light generated from the interface between the transparent protective cover and the air in the above-mentioned device structure will be discussed below.

Figure 6:
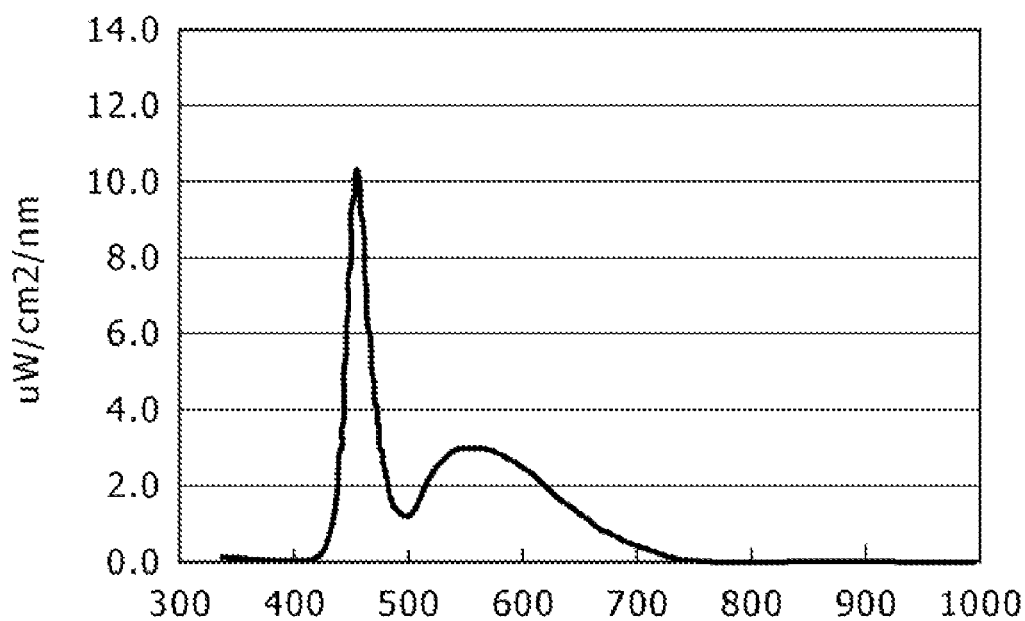
FIG. 6 is a diagram showing the spectrum of back-light light used in a first embodiment.

FIG. 6 is a diagram showing the spectrum of the back-light light used in the first embodiment.

Figure 7:
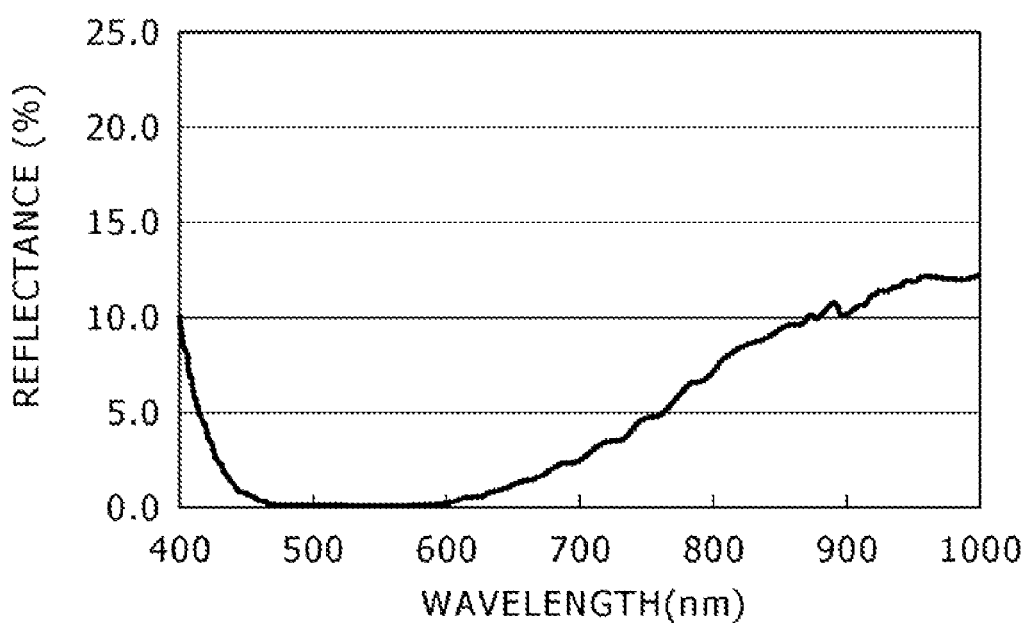
FIG. 7 is a diagram showing a spectral reflectance obtained upon an antireflection treatment in the first embodiment.

FIG. 7 is a diagram showing a spectral reflectance obtained upon an antireflection treatment in the first embodiment.

FIGS. 8A to 8D illustrate the configuration and production process of an antireflection layer according to the first embodiment.

In the first embodiment, a back light illuminates with light in the visible light region, as shown in FIG. 6, and the antireflection layer 29 has undergone or embodies an antireflection treatment optimized for the visible-light back light, as shown in FIG. 7.

Figure 8A:
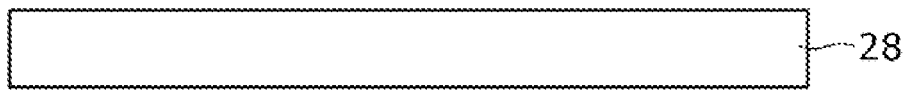
FIGS. 8A to 8D illustrate the configuration and production process of an antireflection layer according to the first embodiment.
Figure 8B:
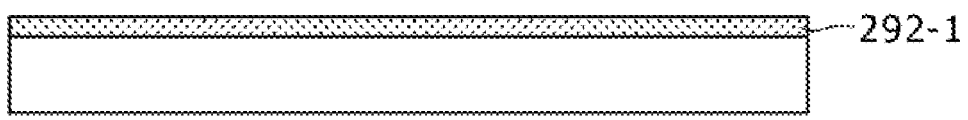
Figure 8C:
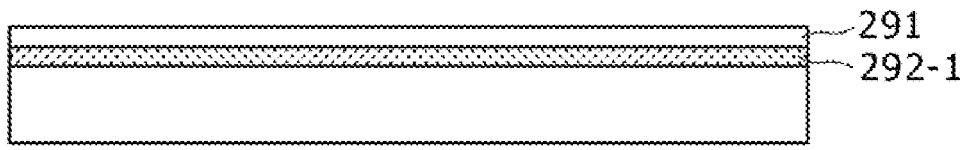
Figure 8D:
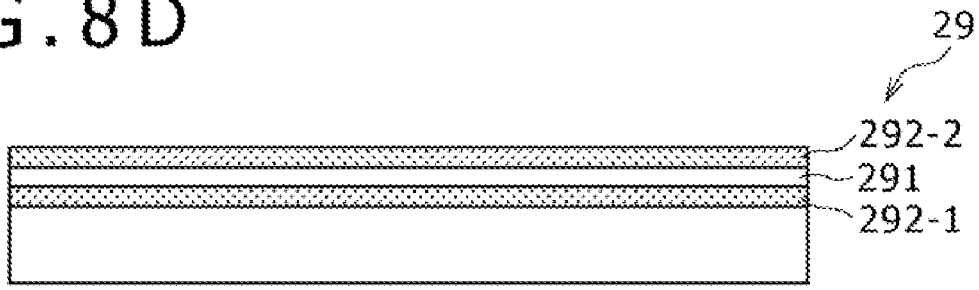

The antireflection layer 29 optimized for the visible-light back light has a multilayer structure in which a high refractive index layer 291 of $TiO_2$ or the like is sandwiched between low refractive index layers 292-1 and 292-2 of $SiO_2$ or the like, as shown in FIG. 8D, for example.

Specifically, the antireflection layer 29 has a configuration in which the low refractive index layer 292-1 of $SiO_2$ or the like is formed on the front-side surface of the second polarizing plate 28, the high refractive index layer 291 of $TiO_2$ or the like is formed on the low refractive index layer 292-1, and the low refractive index layer 292-2 of $SiO_2$ or the like is formed on the high refractive index layer 291.

In such a configuration, the light in the visible light region emitted from the back light 26 is converted by the first polarizing plate 27 into linearly polarized light oscillating in a certain direction, and the linearly polarized light is transmitted through the liquid crystal layer 25. In this instance, the phase difference in the liquid crystal layer 25 varies depending on a voltage impressed on the liquid crystal layer 25.

This results in that the case where the light transmitted through the liquid crystal layer 25 is absorbed by the second polarizing plate 28 and the case where the absorption does not occur are generated, whereby display can be achieved.

The light transmitted through the second polarizing plate 28 enters the antireflection layer 29, but the reflected light from the most face-side surface of the display is eliminated because the antireflection layer 29 has undergone or embodies the antireflection treatment optimized for the visible-light back light, as above-mentioned.

As a result, the influence of noise on the photo-sensors can be reduced, and the S/N of the light receiving system is improved.

Figure 9:
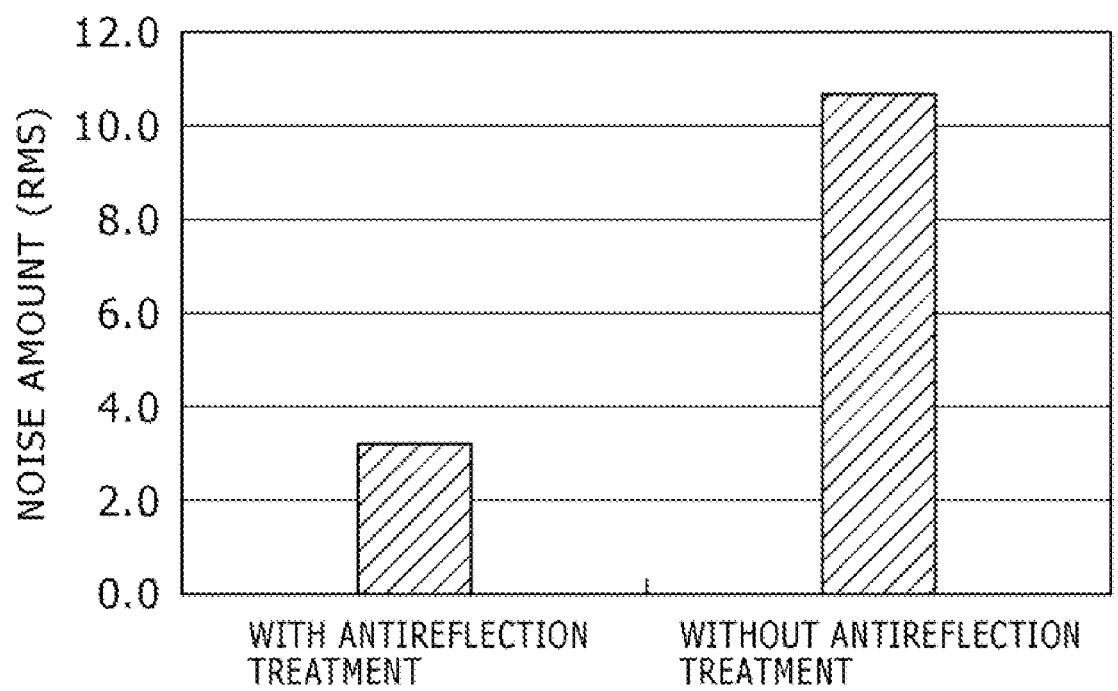
FIG. 9 is a diagram showing a change in noise amount between the case where an antireflection layer is arranged as in the first embodiment and the case where the antireflection layer is not arranged.

FIG. 9 is a diagram showing a change in noise amount between the case where the antireflection layer is arranged as in the first embodiment and the case where the antireflection layer is not arranged.

As is clear from FIG. 9, the arrangement of the antireflection layer has largely reduced the noise amount.

Second Embodiment

Figure 10:
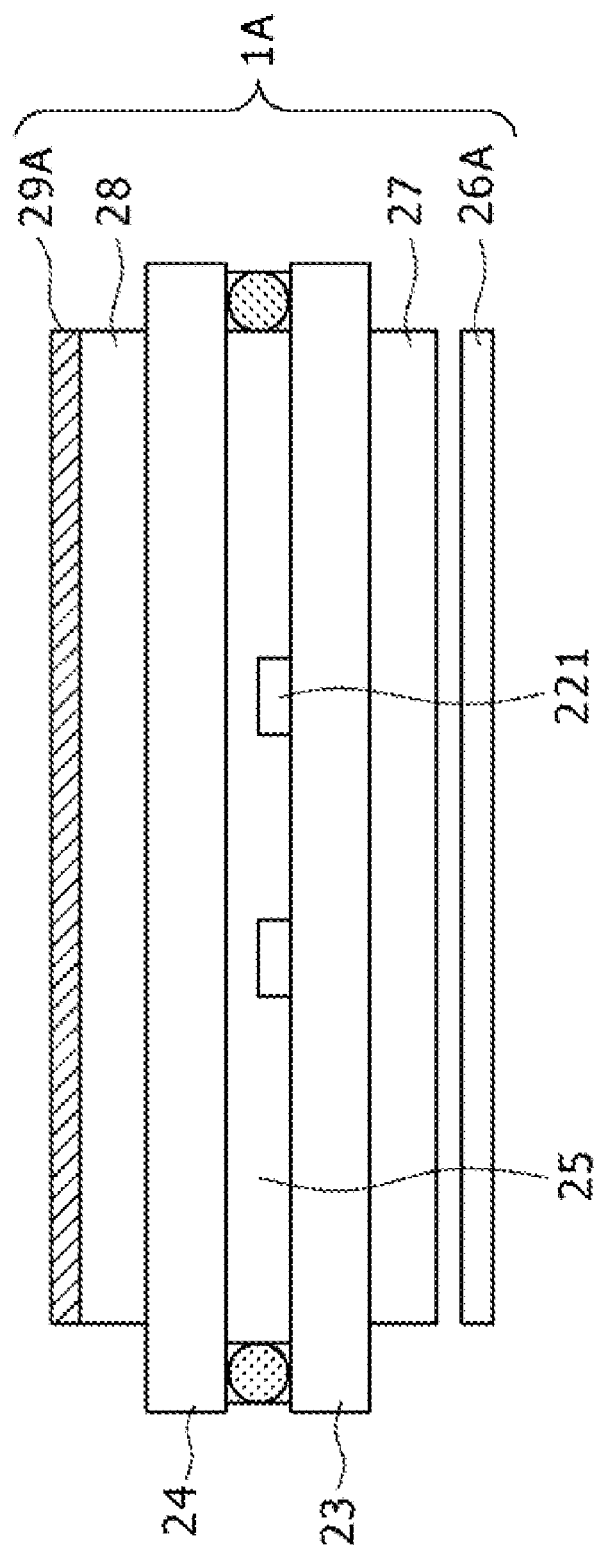
FIG. 10 is a simplified sectional view of a light receiving cell part according to a second embodiment.

FIG. 10 is a simplified sectional view of a light receiving cell part according to a second embodiment.

Figure 11:
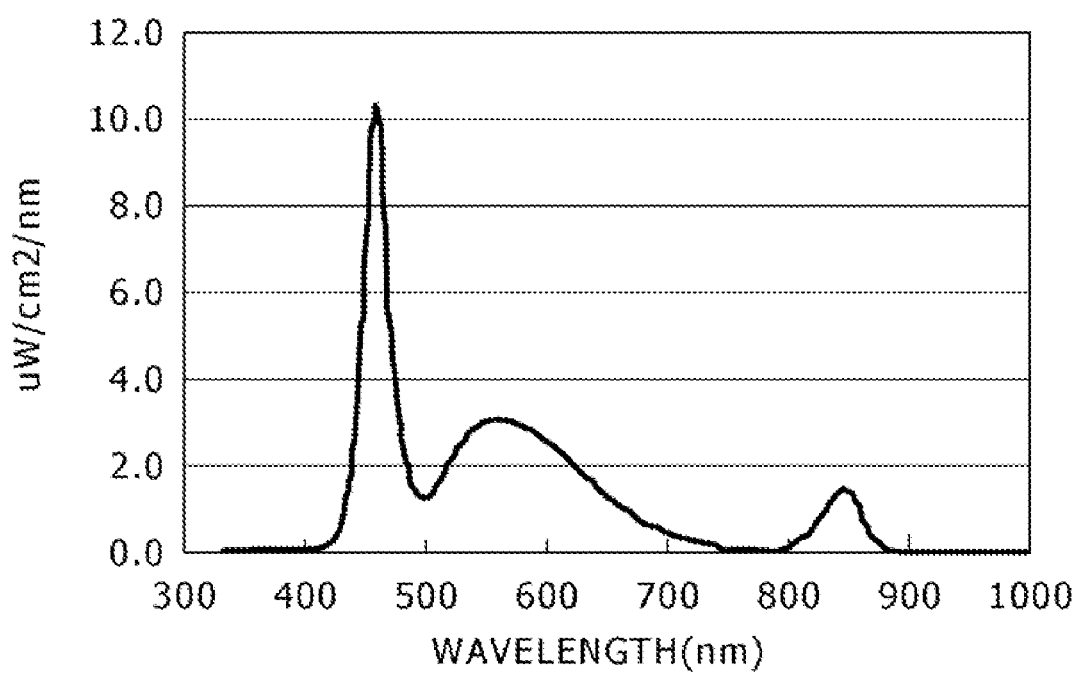
FIG. 11 is a diagram showing the spectrum of back-light light used in the second embodiment.

FIG. 11 is a diagram showing the spectrum of back-light light used in the second embodiment.

Figure 12:
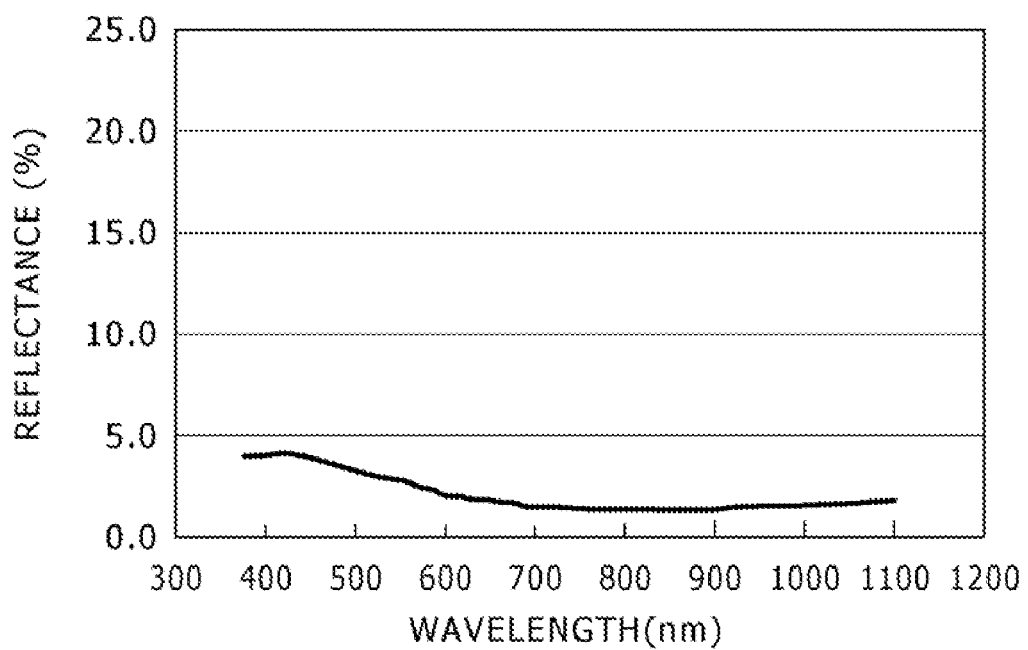
FIG. 12 is a diagram showing a spectral reflectance obtained upon an antireflection treatment in the second embodiment.

FIG. 12 is a diagram showing a spectral reflectance obtained upon an antireflection treatment in the second embodiment.

Figure 13A:
FIGS. 13A and 13B illustrate the configuration and production process of an antireflection layer according to a second embodiment.
Figure 13B:
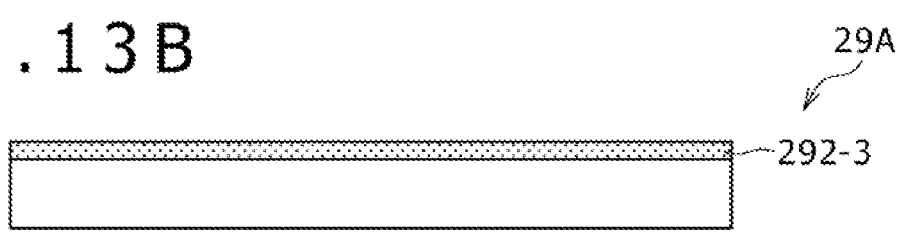

FIGS. 13A and 13B illustrate the configuration and production process of an antireflection layer according to the second embodiment.

In the second embodiment, a back light 26A illuminates with light in the visible region and the infrared region, as shown in FIG. 11, and an antireflection layer 29A has undergone or embodies an antireflection treatment optimized for light ranging from the visible region to the infrared region, as shown in FIG. 12. The infrared region here means the region of wavelength of not less than 700 nm.

The antireflection layer 29A optimized for the visible-light back light and the infrared-light back light has a monolayer structure composed of a low refractive index layer 292-3 of $MgF_2$ or the like, which is lower in refractive index than the polarizing plate, as shown in FIG. 13B, for example.

Specifically, the antireflection layer 29A has a configuration in which the low refractive index layer 292-3 of $MgF_2$ or the like which is lower than a second polarizing plate 28 in refractive index is formed on the front-side surface of the second polarizing plate 28.

In such a configuration, the light transmitted through the second polarizing plate 28 enters the antireflection layer 29A, but the reflected light from the most face-side surface of the display is eliminated because the antireflection layer 29A has undergone or embodies the antireflection treatment optimized for the visible-light back light and the infrared-light back light, as above-mentioned.

As a result, the influence of noise on photo-sensors can be reduced, whereby the S/N of the light receiving system is improved.

Figure 14:
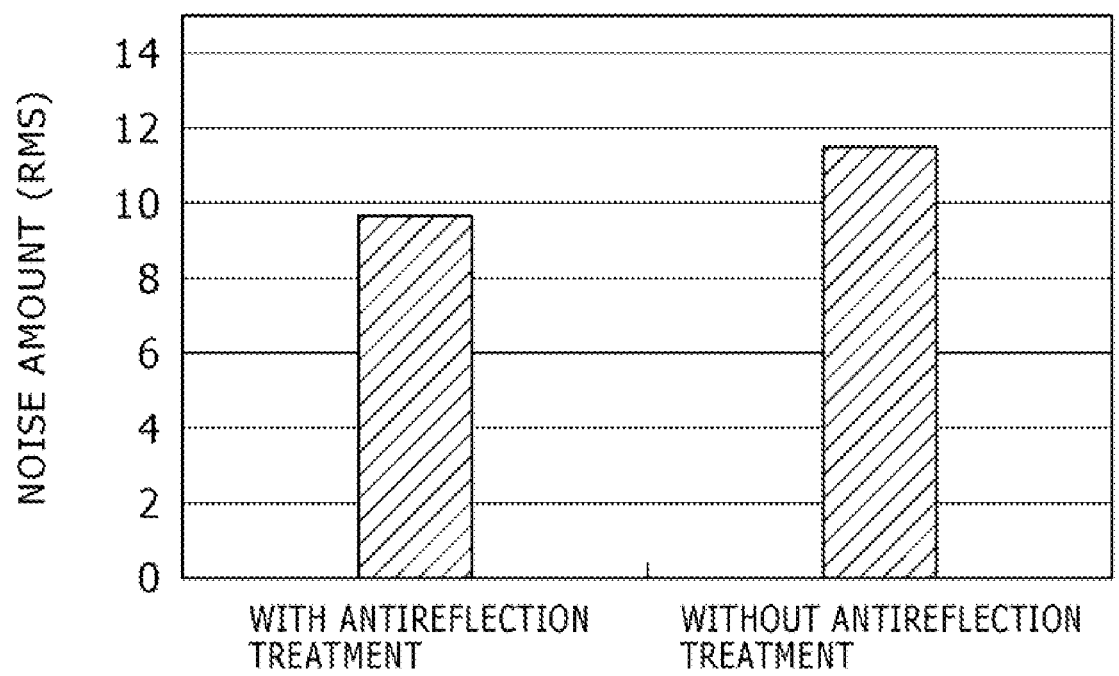
FIG. 14 is a diagram showing a change in noise amount between the case where the antireflection layer is arranged as in the second embodiment and the case where the antireflection layer is not arranged.

FIG. 14 is a diagram showing a change in noise amount between the case where the antireflection layer is arranged as in the second embodiment and the case where the antireflection layer is not arranged.

As is clear from FIG. 14, the arrangement of the antireflection layer has reduced the noise amount.

Incidentally, in the case where infrared rays are used as the detection light, infrared rays other than those in the wavelength band of the infrared rays emitted from the display constitute noise.

In the present embodiment, therefore, the configuration for preventing incidence of light in a wavelength region in which the spectrum of the light emitting section is absent is adopted. Here, the antireflection layer has such a characteristic as to attenuate the incident light in a wavelength region in which the spectrum of the light emitting section is absent, as compared with the incident light in the wavelength region in which the spectrum of the light emitting section is present thereby preventing the light in the wavelength region in which the spectrum of the light emitting section is absent from entering the display. Specific embodiments of this configuration will be described later as seventh, eighth, ninth and tenth embodiments.

Third Embodiment

Figure 15:
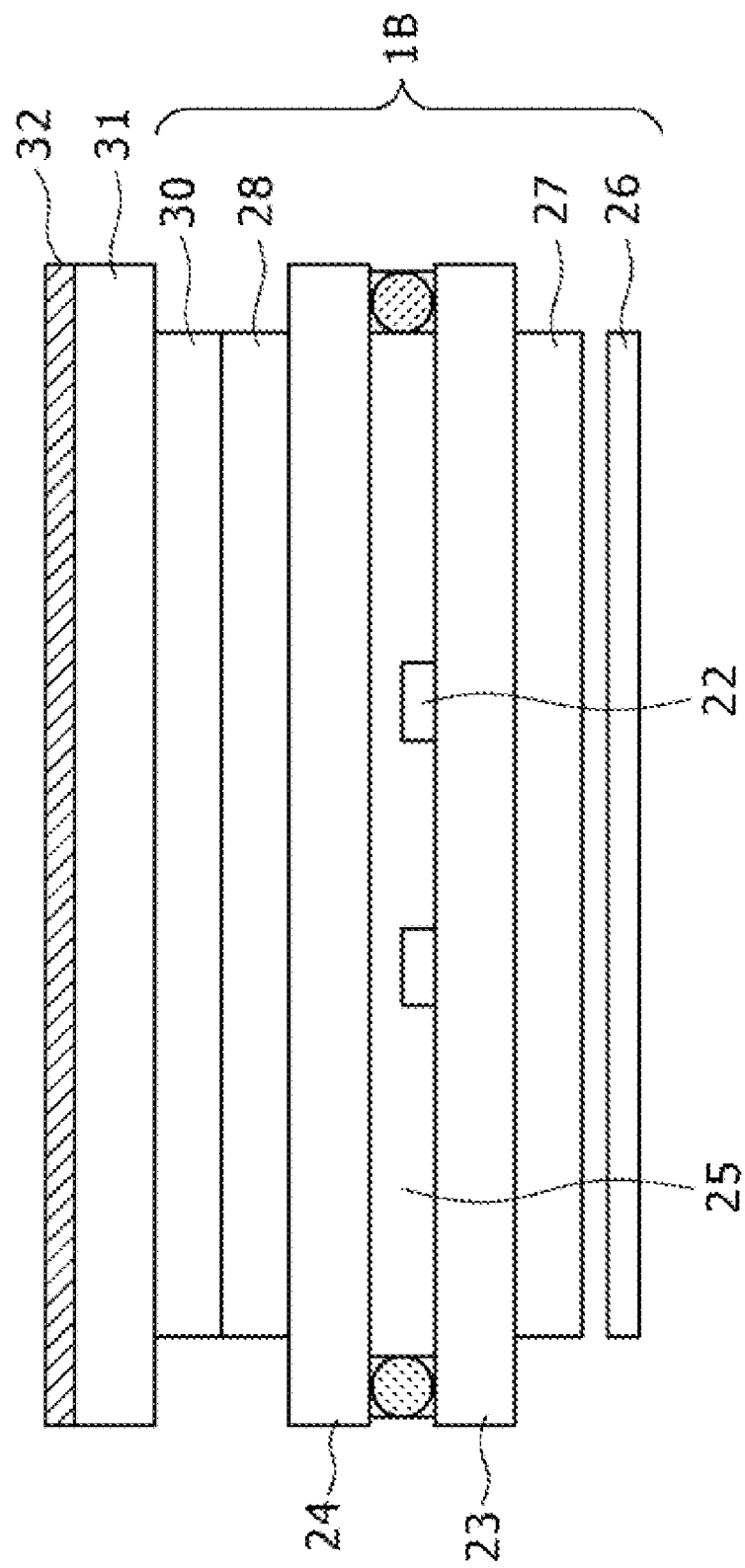
FIG. 15 is a simplified sectional view of a light receiving cell part according to a third embodiment.

FIG. 15 is a simplified sectional view of a light receiving cell part according to a third embodiment.

Figure 16:
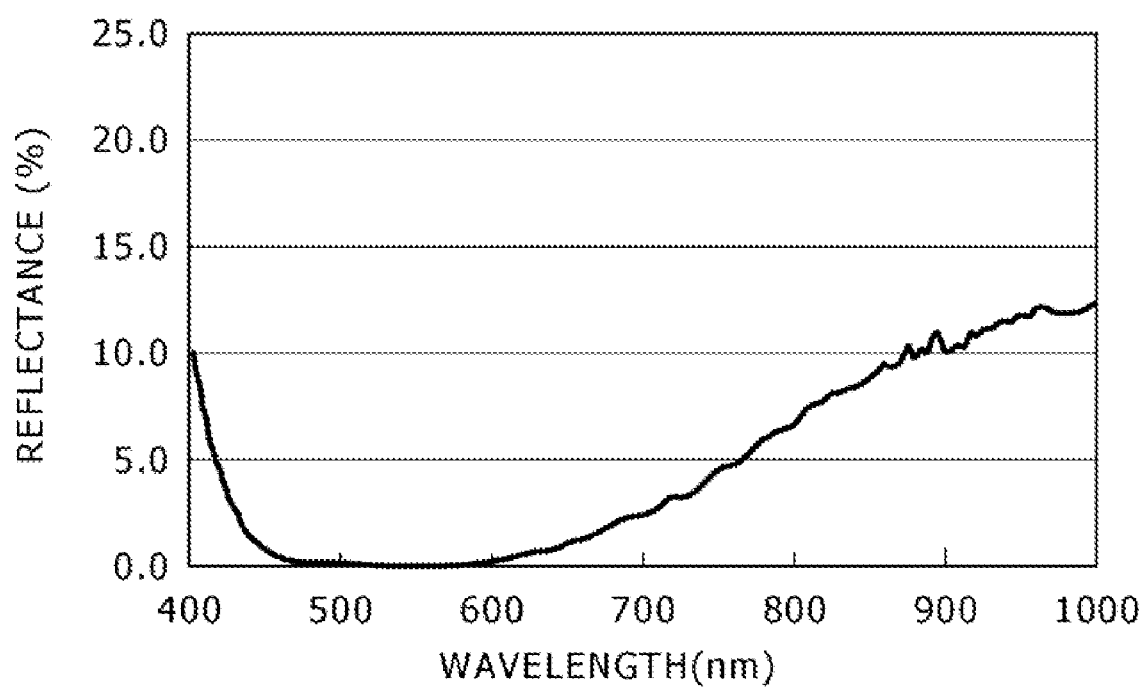
FIG. 16 is a diagram showing a spectral reflectance obtained upon an antireflection treatment according to the third embodiment.

FIG. 16 is a diagram showing a spectral reflectance obtained upon an antireflection treatment in the third embodiment.

FIGS. 17A to 17D illustrate the configuration and production process of an antireflection layer according to the third embodiment.

In the third embodiment, a transparent protective cover (front-side transparent substrate) 31 is disposed on the front side of a polarizing plate 28, with a filler layer 30 therebetween, and an antireflection layer 32 is arranged at the interface between the front side of the protective cover 31 and the air layer.

In the third embodiment, a back light illuminates with light in the visible light region, as shown in FIG. 6, and the antireflection layer 32 has undergone or embodies an antireflection treatment optimized for the visible-light back light, as shown in FIG. 16.

Figure 17A:
FIGS. 17A to 17D illustrate the configuration and production process of an antireflection layer according to the third embodiment.
Figure 17B:
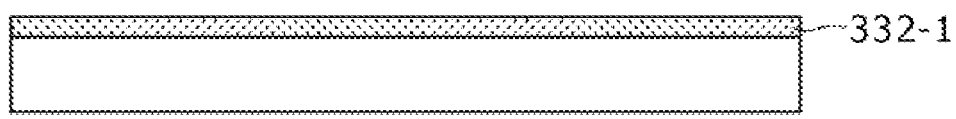
Figure 17C:
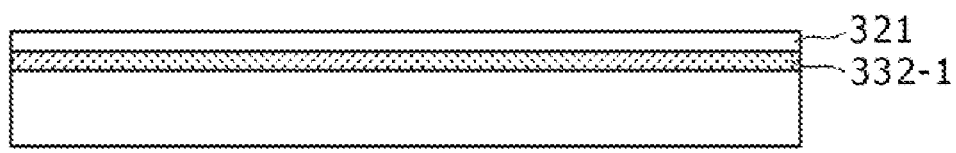
Figure 17D:
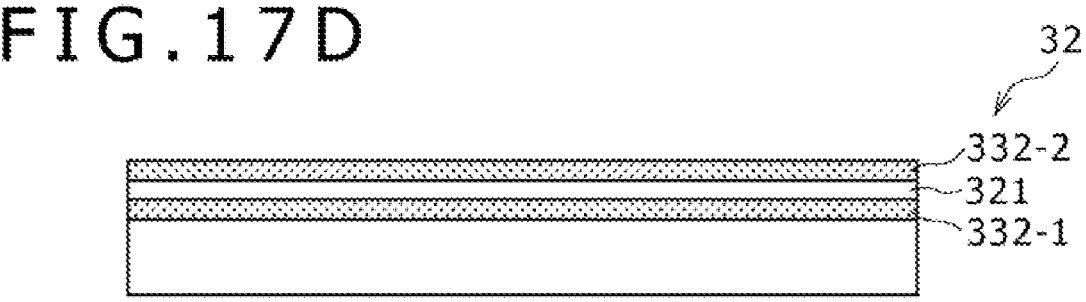

The antireflection layer 32 optimized for the visible-light back light has a multilayer structure in which a high refractive index layer 321 of $TiO_2$ or the like is sandwiched between low refractive index layers 322-1 and 322-2 of $SiO_2$ or the like, as shown in FIG. 17D, for example.

Specifically, the antireflection layer 32 has a configuration in which the low refractive index layer 322-1 of $SiO_2$ or the like is formed on the front-side surface of a protective cover 31, the high refractive index layer 321 of $TiO_2$ or the like is formed on the low refractive index layer 322-1, and the low refractive index layer 322-2 of $SiO_2$ or the like is formed on the high refractive index layer 321.

In such a configuration, the light in the visible light region emitted from a back light 26 is converted by a first polarizing plate 27 into a linearly polarized light oscillating in a certain direction, and the linearly polarized light is transmitted through a liquid crystal layer 25. In this instance, the phase difference in the liquid crystal layer 25 varies depending on a voltage impressed on the liquid crystal layer 25.

This results in that the case where the light transmitted through the liquid crystal layer 25 is absorbed by a second polarizing plate 28 and the case where the absorption does not occur are generated, whereby display can be achieved.

The light transmitted through the second polarizing plate 28, a filler layer 30 and the protective cover 31 enters the antireflection layer 32, but the reflected light generated from the most face-side surface of the display is eliminated because the antireflection layer 32 has undergone or embodies the antireflection treatment optimized for the visible-light back light, as above-mentioned.

As a result, the influence of noise on photo-sensors can be reduced, whereby the S/N of the light receiving system is improved.

Fourth Embodiment

FIG. 18 is a simplified sectional view of a light receiving cell part in a fourth embodiment.

Figure 19:
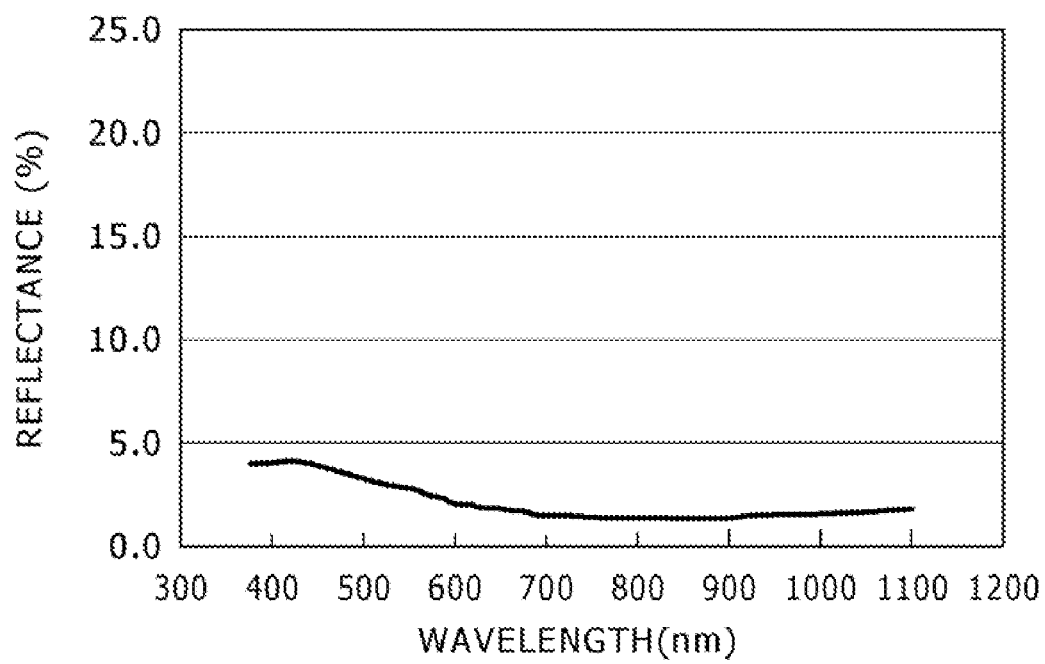
FIG. 19 is a diagram showing a spectral reflectance obtained upon an antireflection treatment according to the fourth embodiment.

FIG. 19 is a diagram showing a spectral reflectance obtained upon an antireflection treatment in the fourth embodiment.

Figure 20A:
FIGS. 20A and 20B illustrate the configuration and production process of an antireflection layer according to the fourth embodiment.
Figure 20B:
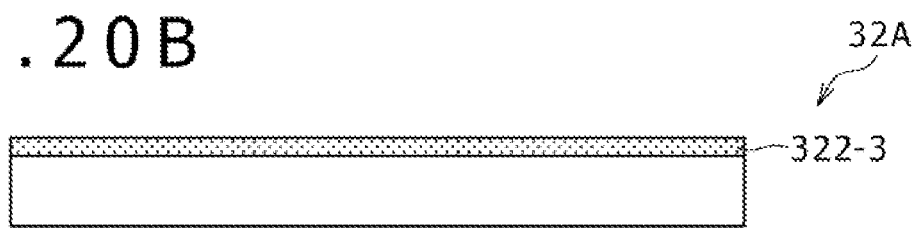

FIGS. 20A and 20B illustrate the configuration and production process of an antireflection layer according to the fourth embodiment.

In the fourth embodiment, a back light 26A illuminates with light in the visible region and the infrared region, as shown in FIG. 11, and an antireflection layer 32A has undergone or embodies an antireflection treatment optimized for a visible-light back light and an infrared-light back light, as shown in FIG. 19.

The antireflection layer 32A optimized for the visible-light back light and the infrared-light back light has a monolayer structure compose of a low refractive index layer 322-3 of $MgF_2$ or the like which is lower in refractive index than the polarizing plate, as shown in FIG. 20B, for example.

Specifically, the antireflection layer 32A has a configuration in which the low refractive index layer 322-3 of $MgF_2$ or the like which is lower than a protective cover 31 in refractive index is formed on the front-side surface of the protective cover 31.

In such a configuration, the light transmitted through the protective cover 31 enters the antireflection layer 32A, but the reflected light generated from the most face-side surface of the display is eliminated because the antireflection layer 32A has undergone or embodies the antireflection treatment optimized for the visible-light back light and the infrared-light back light, as above-mentioned.

Consequently, the influence of noise on photo-sensors can be reduced, whereby the S/N of the light receiving system is improved.

Fifth Embodiment

Figure 21:
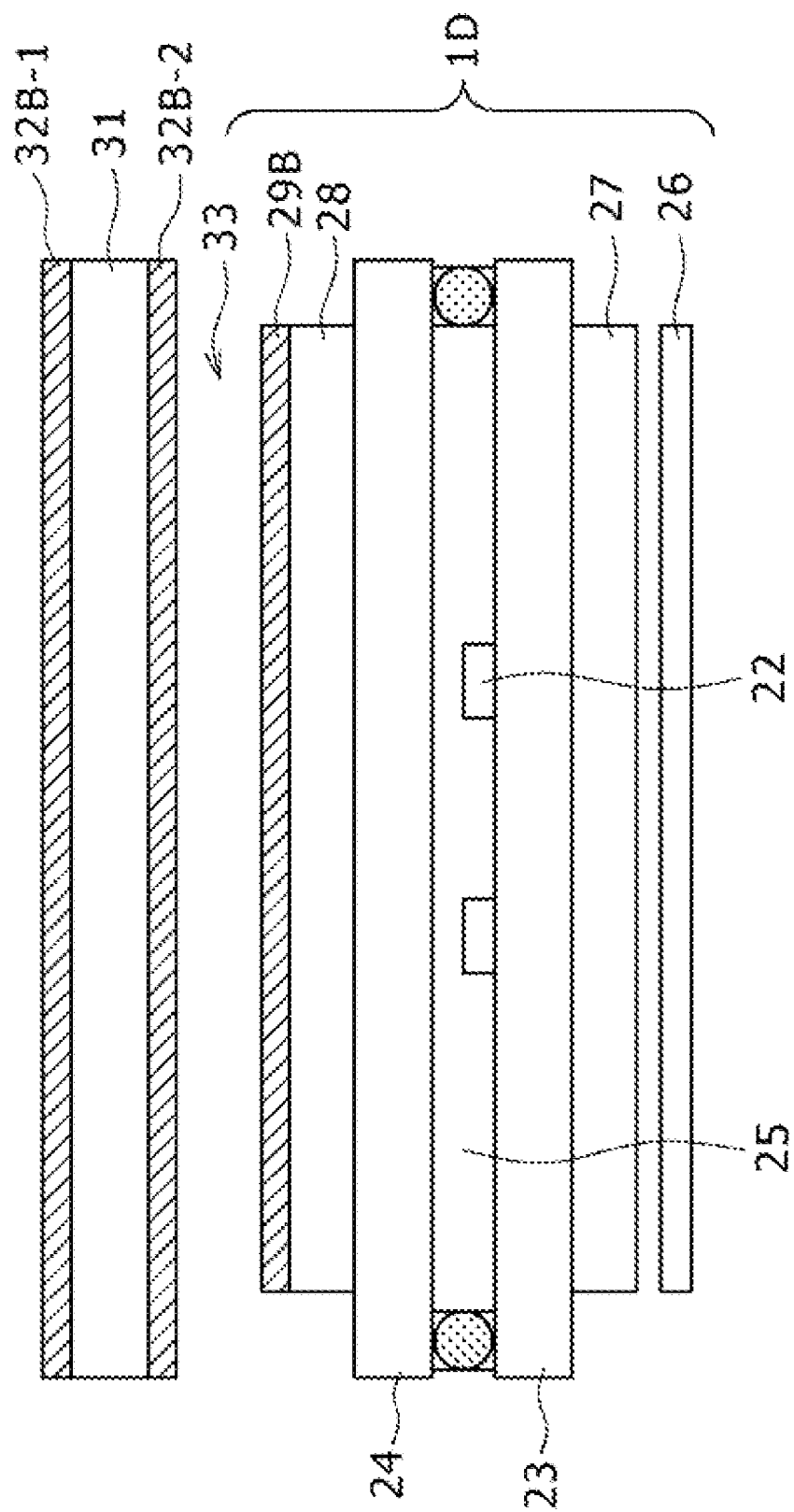
FIG. 21 is a simplified sectional view of a light receiving cell part according to a fifth embodiment.

FIG. 21 is a simplified sectional view of a light receiving cell part according to a fifth embodiment.

Figure 22:
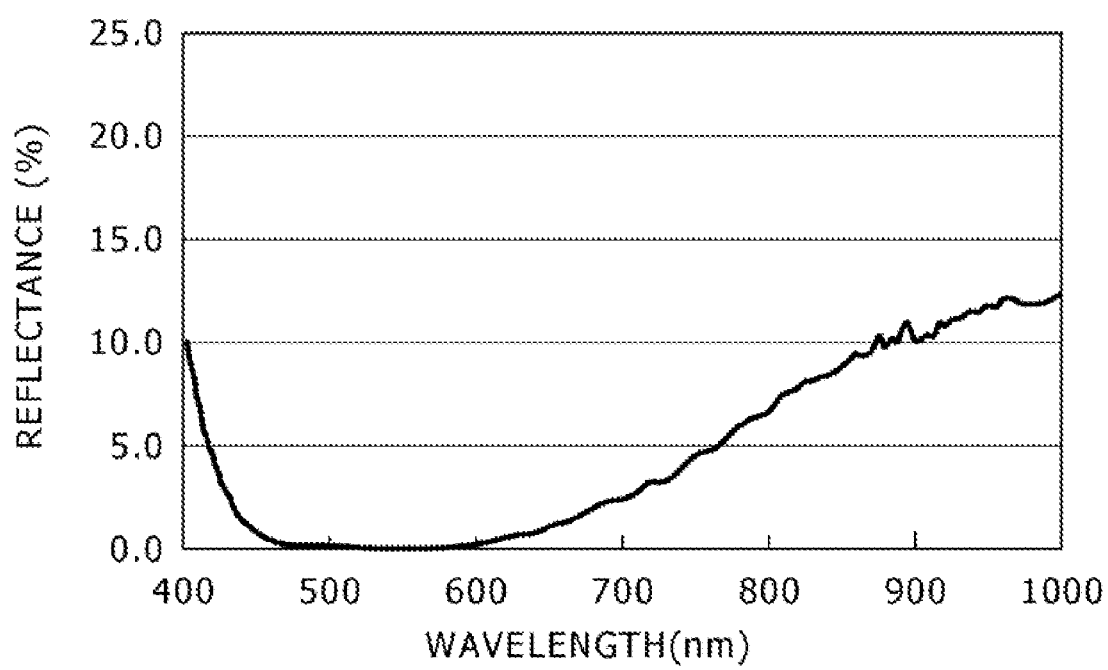
FIG. 22 is a diagram showing a spectral reflectance obtained upon an antireflection treatment according to the fifth embodiment.

FIG. 22 is a diagram showing a spectral reflectance obtained upon an antireflection treatment in the fifth embodiment.

FIGS. 23A to 23D illustrate the configuration and production process of an antireflection layer according to the fifth embodiment.

In the fifth embodiment, a filler layer 30 is not provided on the front side of a polarizing plate 28, and a protective cover (front-side transparent substrate) 31 is provided on this front side, with an air layer 33 therebetween.

Antireflection layers 32B-1, 32B-2 are arranged at interfaces between the protective cover 31 and an air layer on the front side and the back side of the protective cover 31; in addition, the same antireflection layer 29B as in the first embodiment is arranged at the interface between the front side of the second polarizing layer 28 and an air layer 33.

In the fifth embodiment, a back light illuminates with light in the visible light region, as shown in FIG. 6, and the antireflection layer 29B and the antireflection layers 32B-1, 32B-2 have undergone or embody an antireflection treatment optimized for the visible-light back light, as shown in FIG. 22.

Figure 23A:
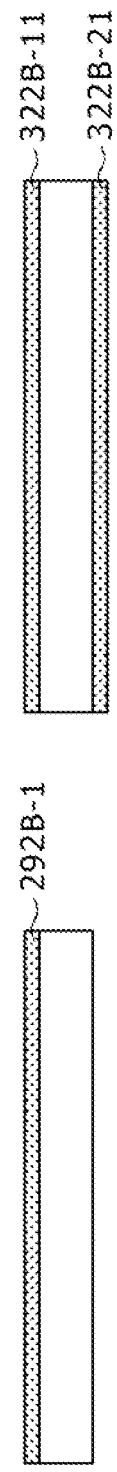
FIGS. 23A to 23D illustrate the configuration and production process of an antireflection layer according to the fifth embodiment.
Figure 23B:
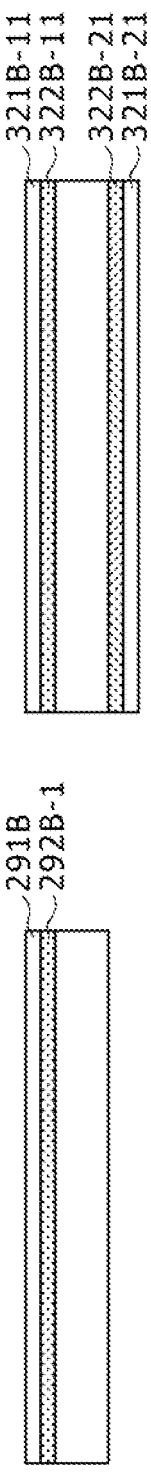
Figure 23C:
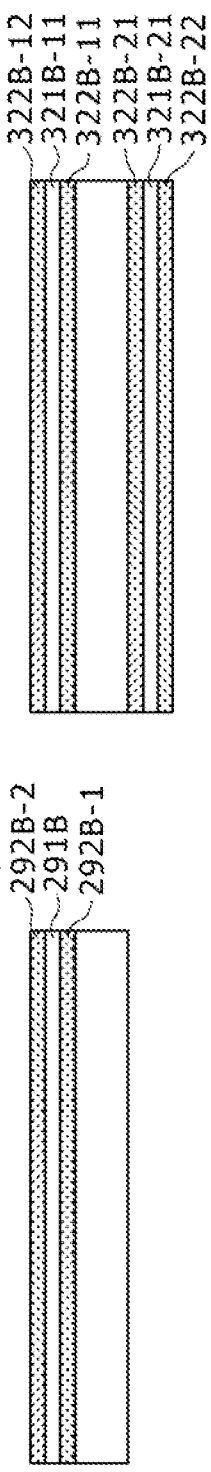
Figure 23D:

Specifically, the antireflection layer 29B optimized for the visible-light back light has a multilayer structure in which, as shown in FIG. 23D, a high refractive index layer 291B of $TiO_2$ or the like is sandwiched between low refractive index layer 292B-1, 292B-2 of $SiO_2$ or the like, in the same manner as in the case of FIG. 8.

In producing the antireflection layer 29B, first, the low refractive index layer 292B-1 of $SiO_2$ or the like is formed on the front-side surface of the second polarizing plate 28. Then, the high refractive index layer 291B of $TiO_2$ or the like is formed on the low refractive index layer 292B-1, and the low refractive index layer 292B-2 of $SiO_2$ or the like is formed on the high refractive index layer 291B.

Similarly, the antireflection layer 32B-1 optimized for the visible-light back light has a multilayer structure in which, as shown in FIG. 23D, a high refractive index layer 321B-11 of $TiO_2$ or the like is sandwiched between low refractive index layers 322B-11, 322B-12 of $SiO_2$ or the like, in the same manner as in the case of FIG. 17.

Specifically, the antireflection layer 32B-1 is configured by forming the low refractive index layer 322B-11 of $SiO_2$ or the like on the front-side surface of the protective cover 31, forming the high refractive index layer 321B-11 of $TiO_2$ or the like on the low refractive index layer 322B-11, and forming the low refractive index layer 322B-12 of $SiO_2$ or the like on the high refractive index layer 321B-11.

The antireflection layer 29B is configured by forming the low refractive index layer 292B-1 of SiO2 or the like on the front-side surface of the second polarizing plate 28, forming the high refractive index layer 291B of TiO2 or the like on the low refractive index layer 292B-1, and forming the low refractive index layer 292B-2 of SiO2 or the like on the high refractive index layer 291B.

Similarly, the antireflection layer 32B-2 optimized for the visible-light back light has a multilayer structure in which, as shown in FIG. 23D, a high refractive index layer 321B-21 of $TiO_2$ or the like is sandwiched between low refractive index layers 322B-21, 322B-22 of $SiO_2$ or the like, in the same manner as in the case of FIG. 17.

Specifically, the antireflection layer 32B-2 is configured by forming the low refractive index layer 322B-21 of $SiO_2$ or the like on the back-side surface of the protective cover 31, forming the high refractive index layer 321B-21 of $TiO_2$ or the like on the low refractive index layer 322B-21, and forming the low refractive index layer 322B-22 of $SiO_2$ or the like on the high refractive index layer 321B-21.

In such a configuration, the light in the visible light region emitted from the back light 26 is converted by a first polarizing plate 27 into linearly polarized light oscillating in a certain direction, and the linearly polarized light is transmitted through a liquid crystal layer 25. In this case, the phase difference in the liquid crystal layer 25 varies depending on a voltage impressed on the liquid crystal layer 25.

This results in that the case where the light transmitted through the liquid crystal layer 25 is absorbed by the second polarizing plate 28 and the case where the absorption does not occur are generated, whereby display can be achieved.

The light transmitted through the second polarizing plate 28, the filler layer 30 and the protective cover 31 enters the antireflection layers 29B, 32B-2 and 32B-1, but the reflected light is eliminated because these antireflection layers have undergone or embody the antireflection treatment optimized for the visible-light back light, as above-mentioned.

As a result, the influence of noise on photo-sensors can be reduced, whereby the S/N of the light receiving system is improved.

Sixth Embodiment

Figure 24:
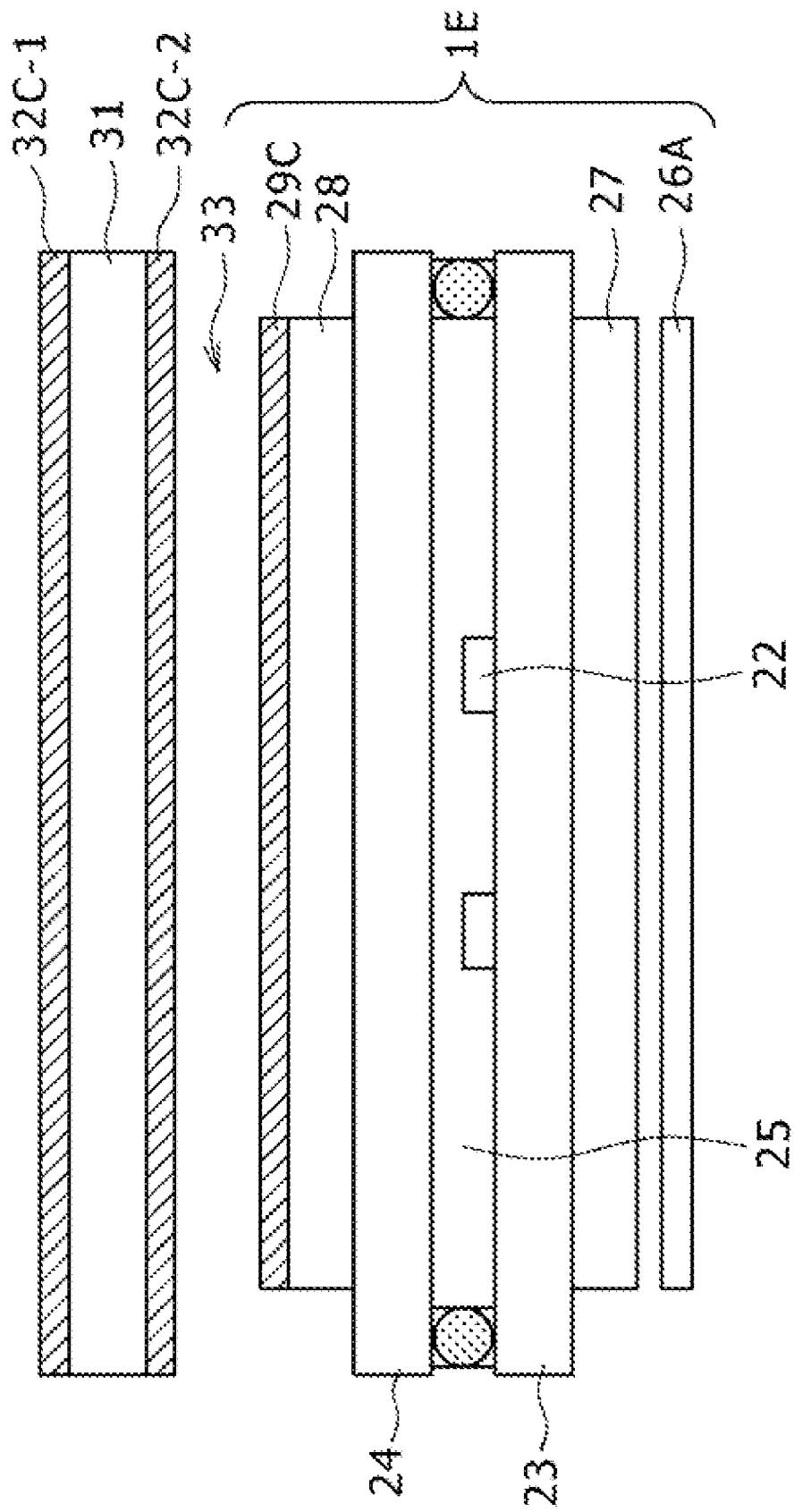
FIG. 24 is a simplified sectional view of a light receiving cell part according to a sixth embodiment.

FIG. 24 is a simplified sectional view of a light receiving cell part according to a sixth embodiment.

Figure 25:
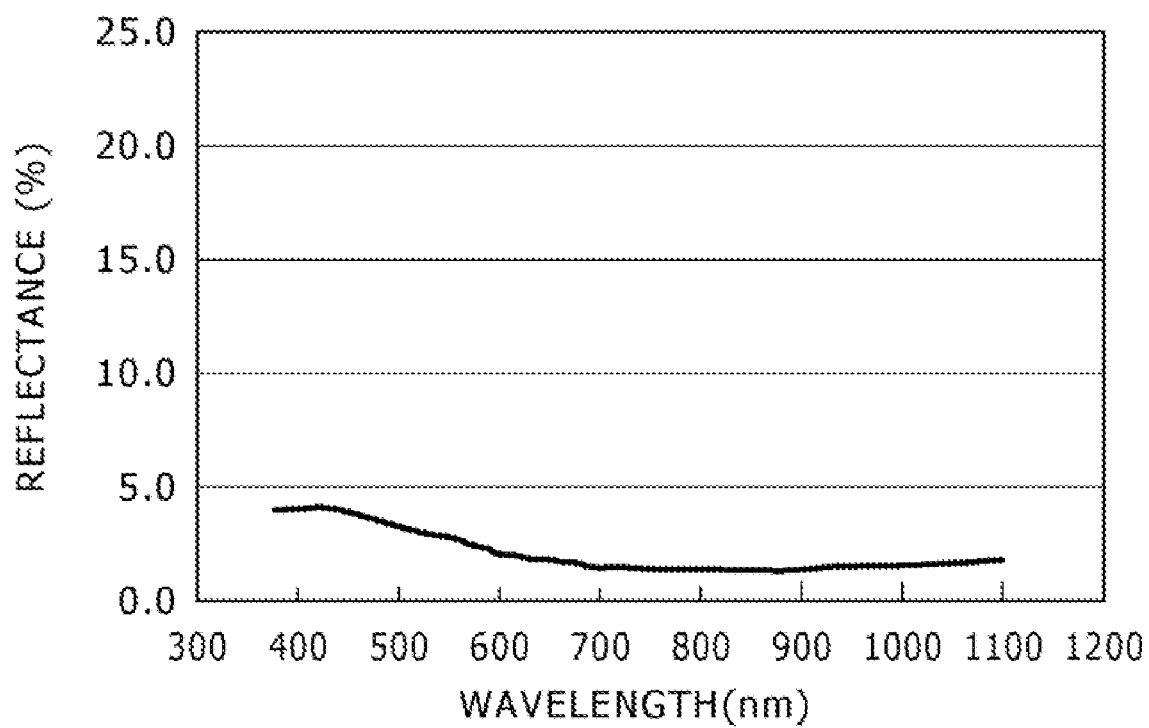
FIG. 25 is a diagram showing a spectral reflectance obtained upon an antireflection treatment according to the sixth embodiment.

FIG. 25 is a diagram showing a spectral reflectance obtained upon an antireflection treatment in the sixth embodiment.

FIGS. 26A and 26B illustrate the configuration and production process of an antireflection layer according to the sixth embodiment.

In the sixth embodiment, a back light 26A illuminates with light in the visible region and the infrared region, as shown in FIG. 11, and antireflection layers 29C, 32C-1 and 32C-2 have undergone or embody an antireflection treatment optimized for a visible-light back light and an infrared-light back light, as shown in FIG. 25.

The antireflection layer 29C optimized for the visible-light back light and the infrared-light back light has a monolayer structure composed of a low refractive index layer 292C-3 of $MgF_2$ or the like, which is lower than a polarizing plate in refractive index, as shown in FIG. 26B, for example.

The antireflection layer 29C has a configuration in which the low refractive index layer 292C-3 of $MgF_2$ or the like lower than a second polarizing plate 28 in refractive index is formed on the front-side surface of the second polarizing plate 28.

The antireflection layer 32C-1 optimized for the visible-light back light and the infrared-light back light has a monolayer structure composed of a low refractive index layer 322C-31 of $MgF_2$ or the like, which is lower than the polarizing plate in refractive index, as shown in FIG. 26B, for example.

The antireflection layer 32C-1 has a configuration in which a low refractive index layer 322C-31 of $MgF_2$ or the like lower than a protective cover 31 in refractive index is formed on the front-side surface of the protective cover 31.

The antireflection layer 32C-2 optimized for the visible-light back light and the infrared-light back light has a monolayer structure composed of a low refractive index layer 322C-32 of $MgF_2$ or the like, which is lower than the polarizing plate in refractive index, as shown in FIG. 26B, for example.

Similarly, the antireflection layer 32C-2 has a configuration in which a low refractive index layer 322C-32 of $MgF_2$ or the like lower than the protective cover 31 in refractive index is formed on the back-side surface of the protective cover 31.

In such a configuration, the light transmitted through the second polarizing plate 28 enters the antireflection layer 29C, the light transmitted through the air layer 33 enters the antireflection layer 32C-2, and the light transmitted through the protective cover 31 enters the antireflection layer 32C-1. In this case, the reflected light generated from the most face-side surface of the display is eliminated, since these antireflection layers have undergone or embody the antireflection treatment optimized for the visible-light back light and the infrared-light back light, as above-mentioned.

Consequently, the influence of noise on photo-sensors can be reduced, whereby the S/N of the light receiving system is improved.

Now, embodiments of a light receiving cell with which external light resistance characteristic (operable environment) can be broadened by adopting a configuration for preventing incidence of light in a wavelength region in which the spectrum of a light emitting section is absent, will be described below.

Seventh Embodiment

Figure 27:
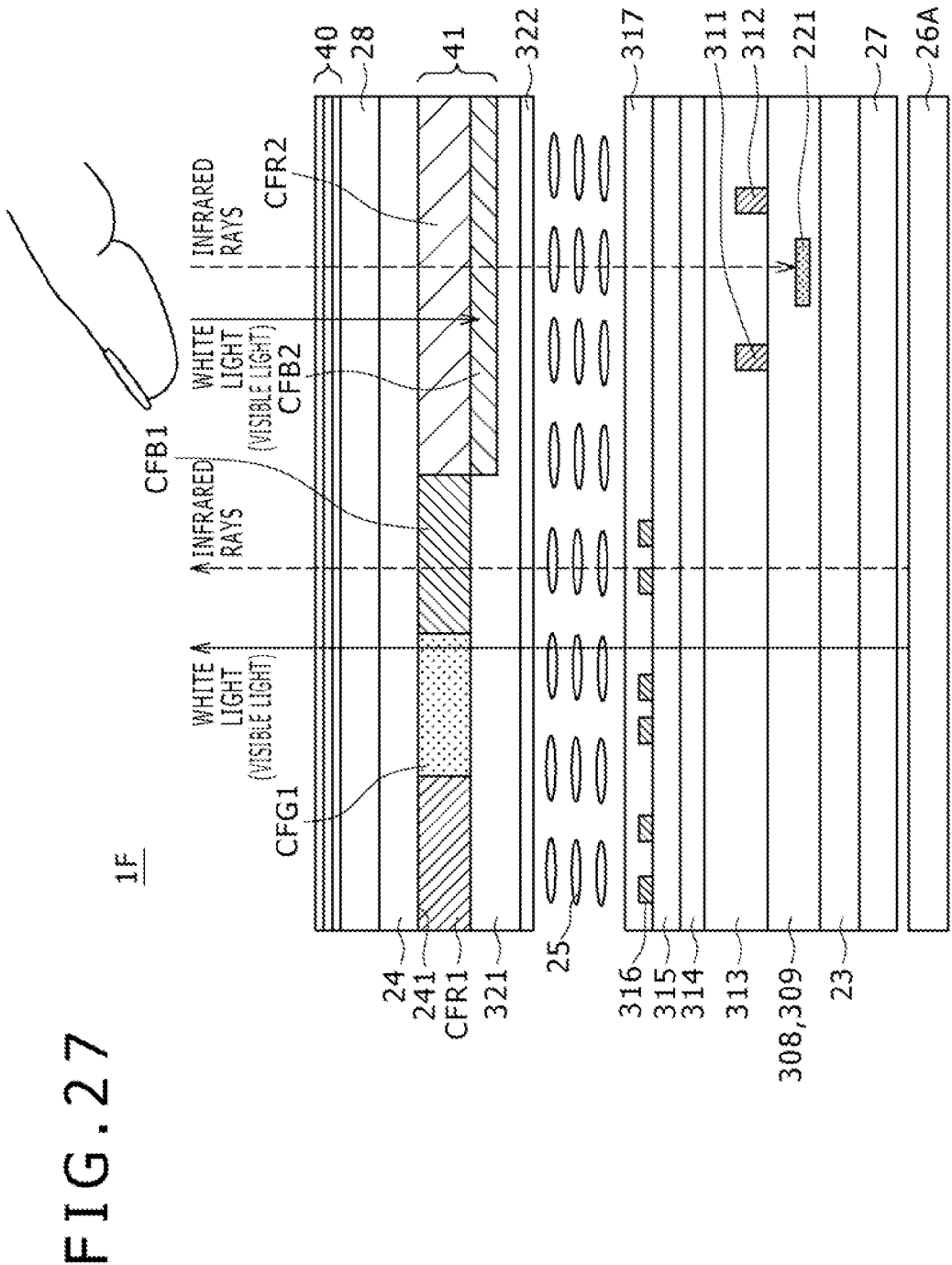
FIG. 27 is a sectional view of a light receiving cell part according to a seventh embodiment.

FIG. 27 is a sectional view of a light receiving cell part according to a seventh embodiment.

Figure 28:
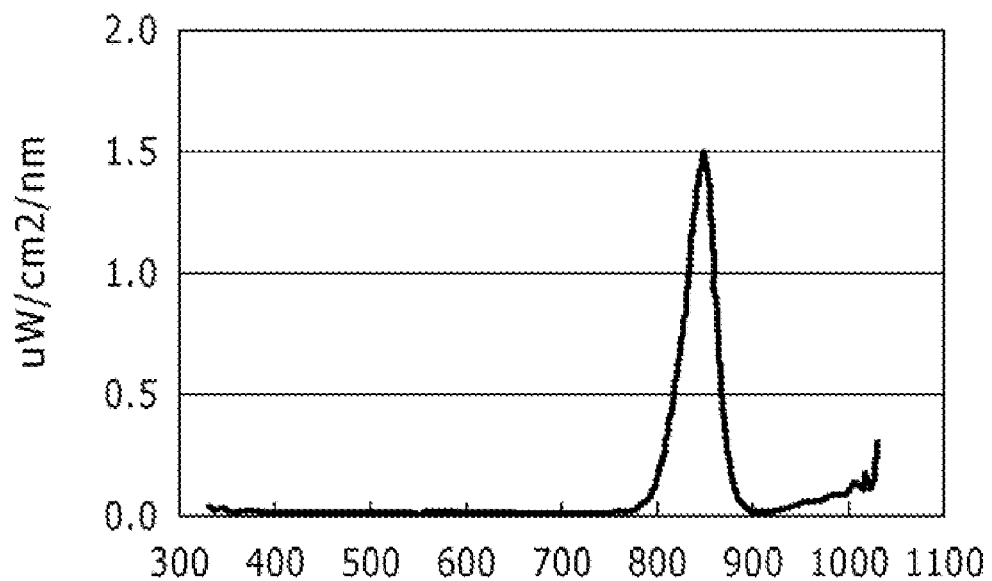
FIG. 28 is a diagram showing the spectrum of infrared back-light light used in the seventh embodiment.

FIG. 28 is a diagram showing a spectral reflectance of infrared-ray back-light light used in the seventh embodiment.

A liquid crystal display 1F according to the seventh embodiment shows the device structure more in detail, as compared with the first to sixth embodiments.

Of an insulator film and the like formed over a TFT substrate 23, the same component parts as those in FIG. 5 are denoted by the same symbols as used above and a photo-sensor is denoted as a light receiving element 221.

It is to be noted here, however, that in the TFT substrate 23, a common transparent electrode 314 of ITO (Indium Tin Oxide) or the like is formed on a flattening film 313, an insulator film 315 of $SiO_2$ or the like is formed on the transparent electrode 314, and a pixel electrode 316 is formed on the insulator film 315. Besides, an orientation film 317 is so formed as to cover the pixel electrode 316.

In addition, R (red), G (green) and B (blue) color filters CFR, CFG and CFB are formed side by side on the principal surface 241 side of an opposite substrate 24 correspondingly to the region of a display cell 21.

In a region opposite to a light receiving cell 22 which is in side-by-side relation with these color filters CFR1, CFG1, CFB1, an R color filter CFR2 and a B color filter CFB2 are stacked to form a visible light cutting filter 41.

Besides, a flattening film 321 is so formed as to cover these color filters CFR1, CFG1, CFB1, CFB2 and CFR2, and an orientation film 322 is formed on the flattening film 321.

Further, a liquid crystal layer 25 is formed between the orientation films 317 and 322.

In the liquid crystal display 1F according to the seventh embodiment, a back light 26A radiates light in the visible region and the infrared region, as shown in FIGS. 11 and 27.

In the liquid crystal display 1F, an infrared light (infrared ray) cutting layer 40 is formed on the most face-side surface of a polarizing plate 28 as an antireflection layer.

As shown in FIG. 28, the infrared-ray back-light light has a peak at a wavelength of 850 nm. Infrared rays with wavelengths of not less than 900 nm constitute noise. In view of this, the infrared ray cutting layer 40 has a function of cutting far infrared rays with wavelengths of, for example, not less than 900 nm, which would constitute noise; as a result, the incidence of noise-constituting infrared rays on photo-sensors 221 is prevented.

Besides, in the liquid crystal display 1F in the seventh embodiment, a visible light cutting filter 41 is arranged so as to prevent incidence of external visible light on the photo-sensors.

The infrared light cutting layer 40 can be formed, for example, by forming a multilayer dielectric film or an infrared absorbing coloring matter film.

Figure 29:
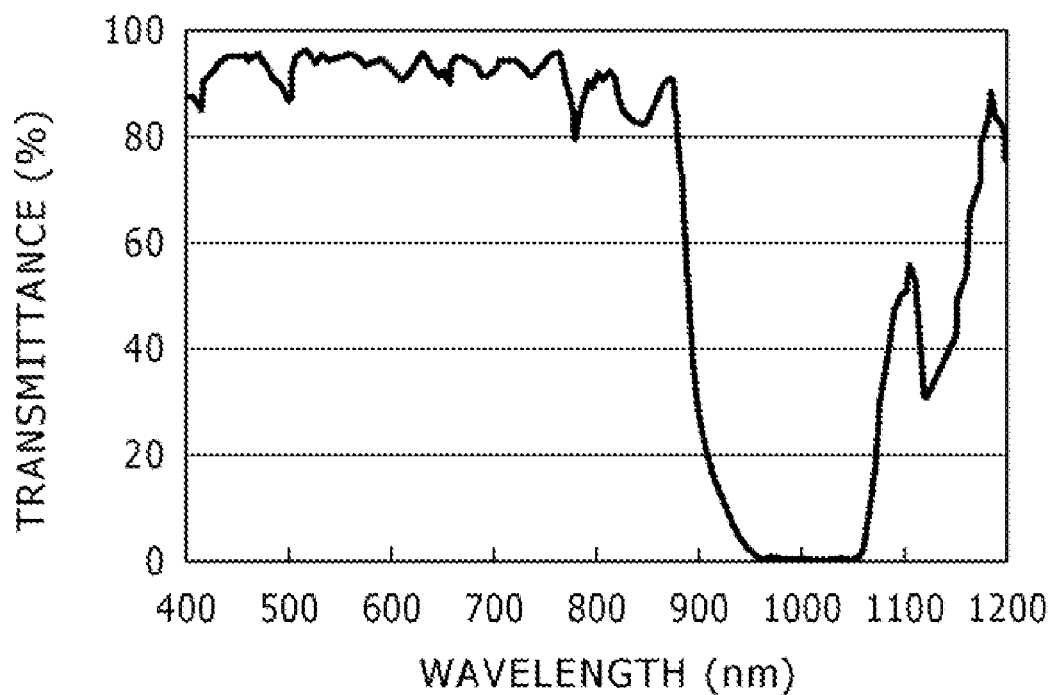
FIG. 29 is a diagram showing transmittance characteristic plotted against wavelength in the case where an infrared light cutting layer is formed by use of a multilayer dielectric film.

FIG. 29 is a diagram showing transmittance characteristic plotted against wavelength in the case where the infrared light cutting layer is composed of a multilayer dielectric film.

As shown in FIG. 29, where the multilayer dielectric film is arranged as the infrared light cutting layer 40, the light in the spectrum of the light emitting section is transmitted through the layer, whereas the light which is contained in the external light and the spectrum of which is outside the spectrum of the light emitting section is reflected by the layer and can therefore be prevented from being incident on photo-sensors.

Figure 30:
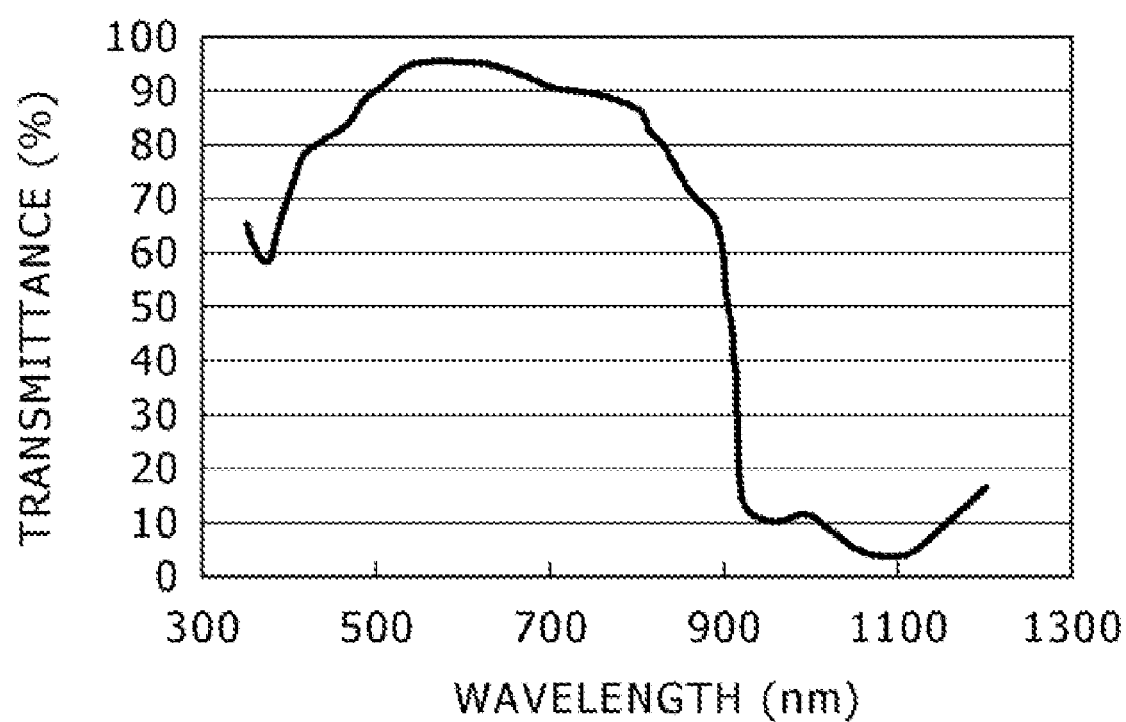
FIG. 30 is a diagram showing transmittance characteristic plotted against wavelength in the case where an infrared light cutting layer is formed by use of an infrared absorbing coloring matter film.

FIG. 30 is a diagram showing transmittance characteristic plotted against wavelength in the case where the infrared light cutting layer is composed of an infrared absorbing coloring matter film.

As shown in FIG. 30, where the infrared absorbing coloring matter film is arranged as the infrared light cutting layer 40, the light in the spectrum of the light emitting section is transmitted through the layer, whereas the light which is contained in the external light and the spectrum of which is outside the spectrum of the light emitting section is absorbed by the layer and can therefore be prevented from being incident on photo-sensors.

Figure 31A:
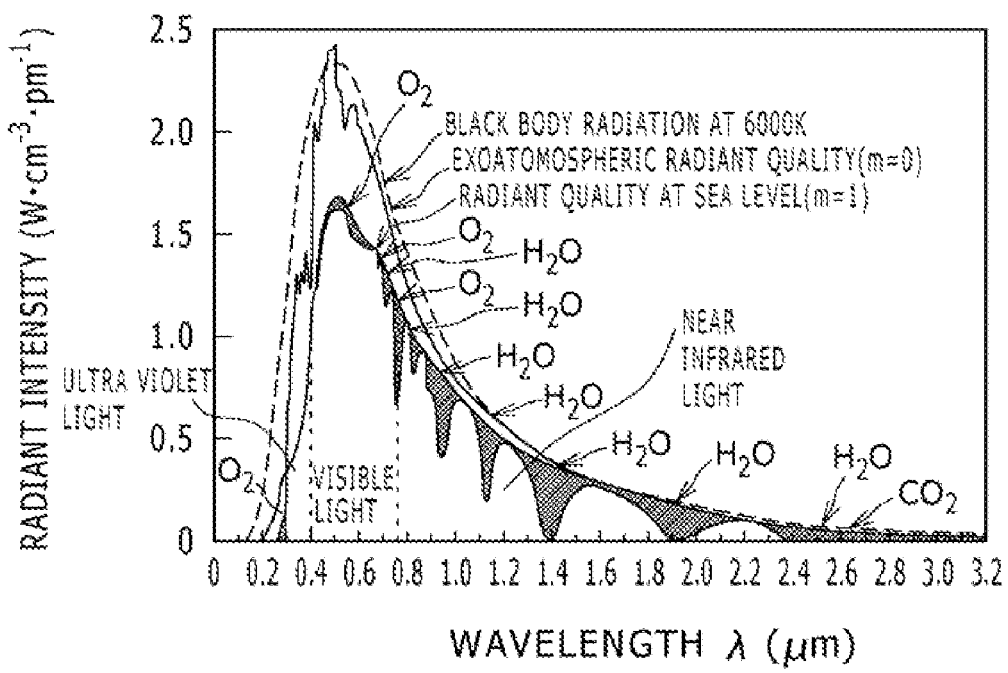
FIGS. 31A and 31B illustrate examples of external light spectrum on which an effect can be expected according to the seventh embodiment.
Figure 31B:
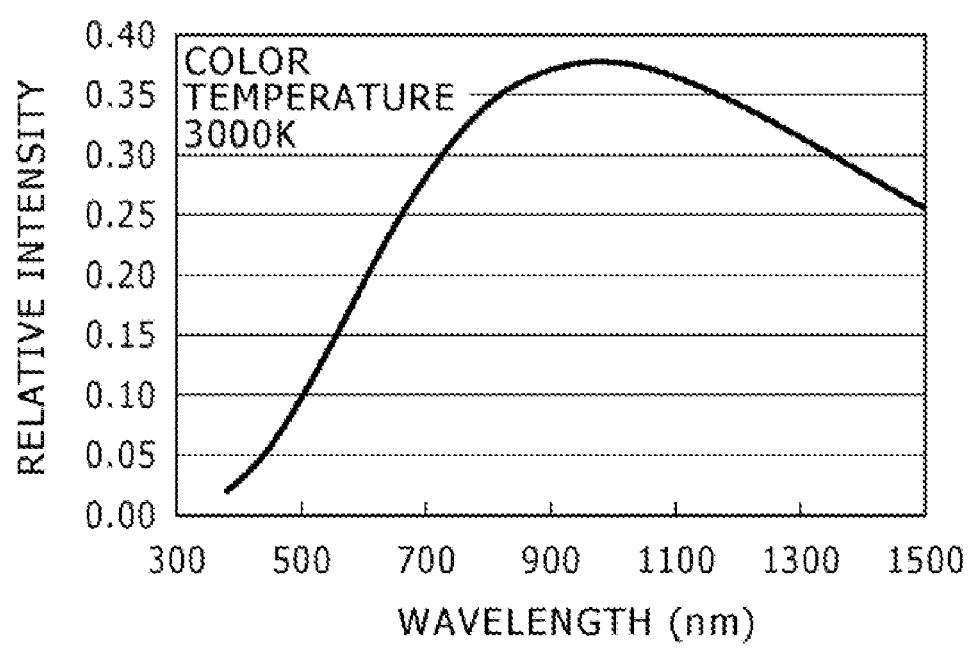

FIGS. 31A and 31B show examples of external light spectrum on which an effect can be expected according to the seventh embodiment.

FIG. 31A shows the spectrum of sunlight, while FIG. 31B shows the spectrum of an incandescent lamp.

As shown in the figures, the sunlight and the incandescent-lamp light contain large quantities of light with wavelengths of not less than 900 nm.

Therefore, the infrared light cutting layer 40 in the present embodiment can exhibit a sufficient intercepting function to external light, such as sunlight and incandescent-lamp light, which contains a large quantity of light with wavelengths of not less than 900 nm.

The sunlight spectrum shown in FIG. 31A was quoted from *Taiyo Enerugi Dokuhon* (*Readings: Solar Energy*), complied by Japan Solar Energy Society, p. 10 [Kiyomi Murai], Ohm-sha, Ltd. (1975).

In addition, the visible light cutting filter 41 is formed as an RB filter by stacking an R color filter CFR2 and a B color filter CFB2, as above-mentioned.

Or, the visible light cutting filter 41 is formed as an RGB filter with a three-layer structure by further using a G color filter CFG2.

Figure 32A:
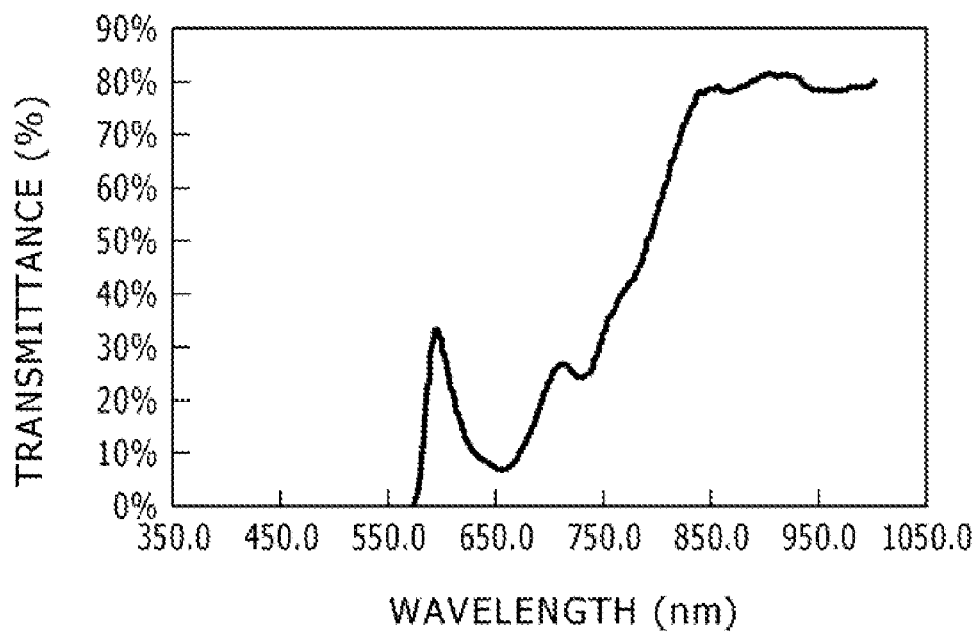
FIGS. 32A and 32B are diagrams showing spectra of light transmitted through visible light cutting filters.
Figure 32B:
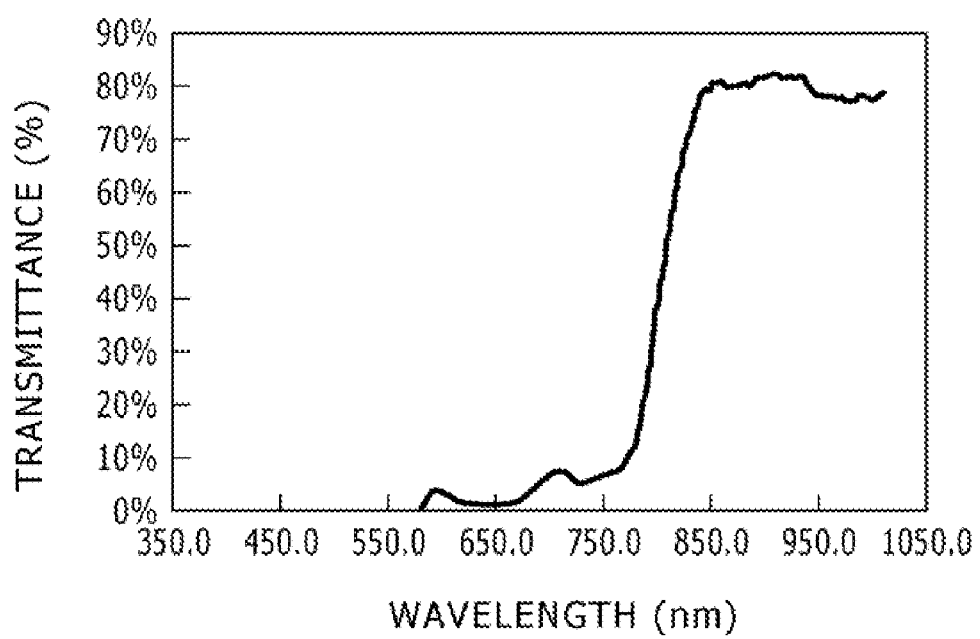

FIGS. 32A and 32B are diagrams showing spectra of light transmitted through the visible light cutting filters.

FIG. 32A shows the characteristics of the RB filter, and FIG. 32B shows the characteristics of the RGB filter.

As shown in the figures, the visible light cutting filter can exhibit a good visible light cutting function by arranging the color filters in a stacked state inside the display.

According to the seventh embodiment, the incidence of light in a wavelength region in which the spectrum of the light emitting section is absent can be prevented, even in the case of using infrared rays as the detection light, and external light resistance (operable environment) can be broadened.

Besides, the influence of noise on the photo-sensors can be reduced, whereby the S/N of the light receiving system is improved.

Eighth Embodiment

FIG. 33 is a sectional view of a light receiving cell part according to an eighth embodiment.

A liquid crystal display 1G in the eighth embodiment differs from the liquid crystal display 1F in the seventh embodiment in that a transparent protective cover 31 is disposed on the front side of a polarizing plate 28, with a filler layer 30 therebetween, and an infrared light (infrared ray) cutting layer 40 is arranged at the interface between the front side of the protective cover 31 and an air layer.

According to the eighth embodiment, the incidence of light in a wavelength region in which the spectrum of a light emitting section is absent can be prevented, even in the case of using infrared rays as the detection light, and external light resistance characteristic (operable environment) can be broadened.

Besides, the influence of noise on photo-sensors can be reduced, whereby the S/N of the light receiving system is improved.

Ninth Embodiment

Figure 34:
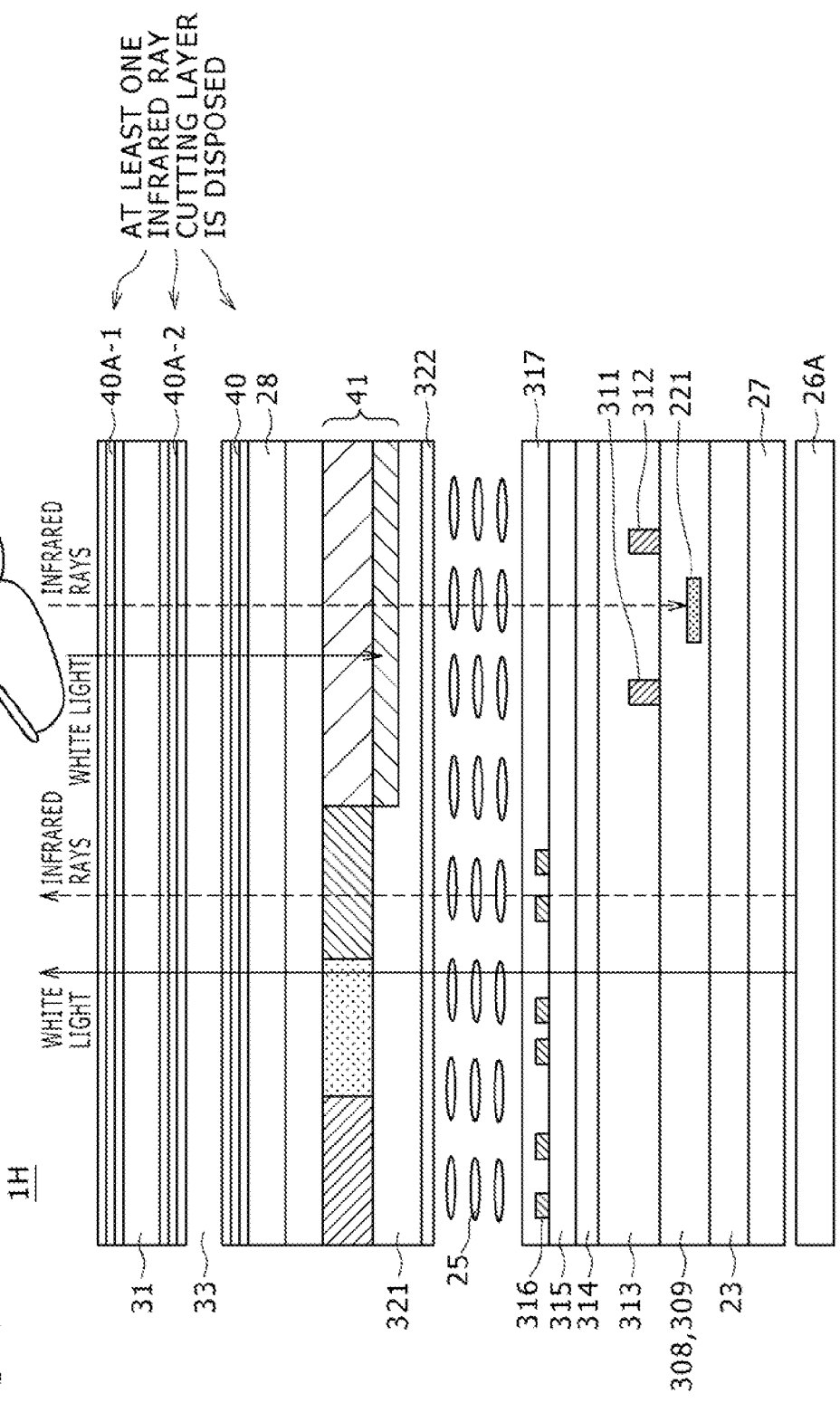
FIG. 34 is a sectional view of a light receiving cell part according to a ninth embodiment.

FIG. 34 is a sectional view of a light receiving cell part according to a ninth embodiment.

A liquid crystal display 1H in the ninth embodiment differs from the liquid crystal display 1F in the seventh embodiment in the following points.

In the ninth embodiment, the filler layer 30 is not provided on the front side of a polarizing plate 28, and a transparent protective cover (front-side transparent plate) 31 is disposed on the front side of the polarizing plate 28, with an air layer 33 therebetween.

In addition, infrared light (ray) cutting layers 40A-1, 40A-2 are arranged at interfaces between the protective cover 31 and an air layer on the front side and the back side of the protective cover 31, and the same infrared light (ray) cutting layer 40 as that in the seventh embodiment is arranged at the interface between the front side of a second polarizing plate 28 and the air layer 33.

According to the ninth embodiment, the incidence of light in a wavelength region in which the spectrum of the light emitting section is absent can be prevented, even in the case of using infrared rays as the detection light, and external light resistance characteristic (operable environment) can be broadened.

Besides, the influence of noise on photo-sensors can be reduced, whereby the S/N of the light receiving system is improved.

Tenth Embodiment

Figure 35:
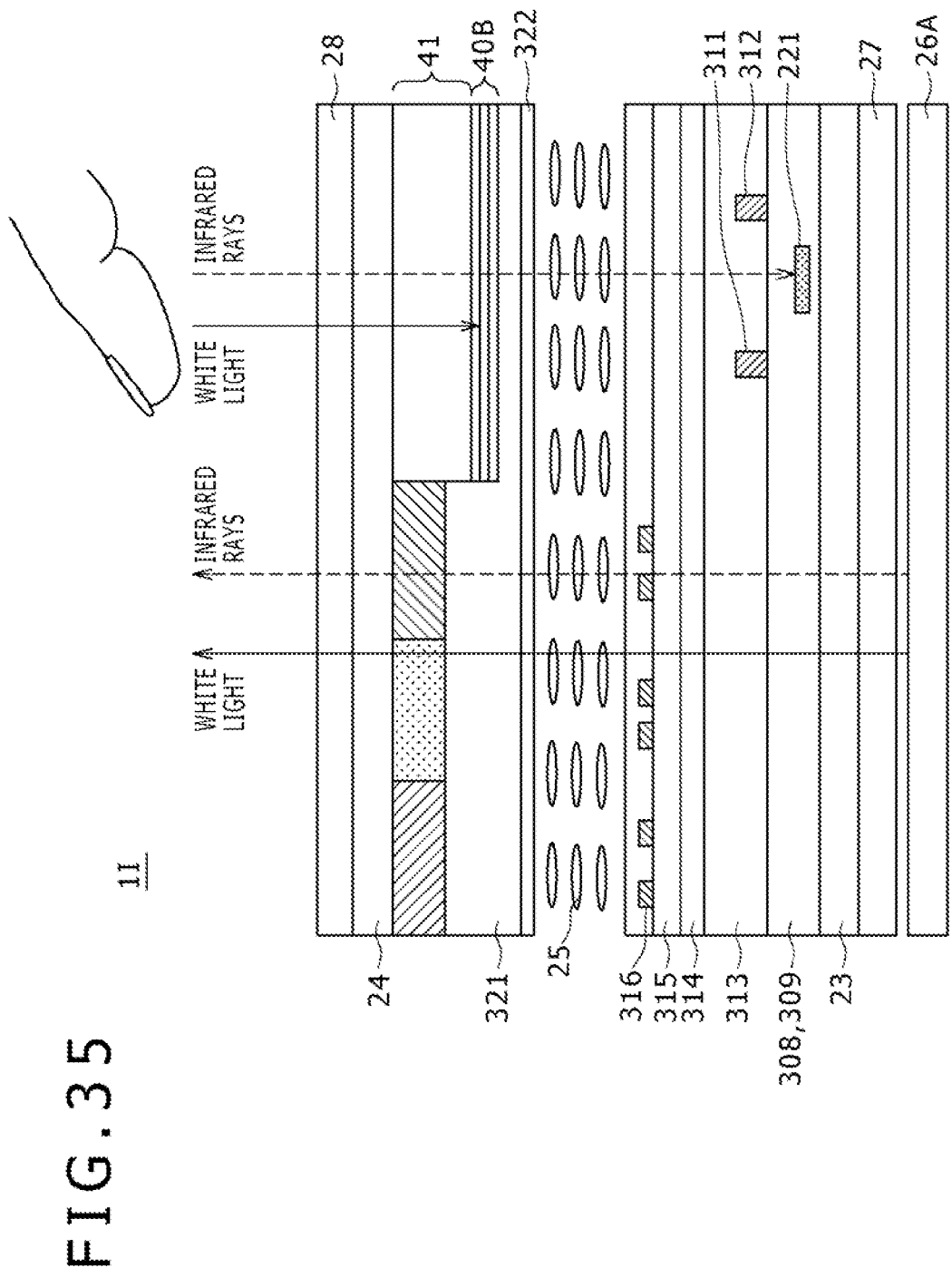
FIG. 35 is a sectional view of a light receiving cell part according to a tenth embodiment.

FIG. 35 is a sectional view of a light receiving cell part according to a tenth embodiment.

A liquid crystal display 1I in the tenth embodiment differs from the liquid crystal display 1F in the seventh embodiment in that an infrared light (ray) cutting layer 40B is arranged inside the display.

In this embodiment, the infrared light (ray) cutting layer 40B is stacked on a back side of a visible light cutting filter 41.

For example, an infrared ray absorbing coloring matter is mixed with a resist so as to enable patterning in a photolithograph step, whereby the infrared ray absorbing coloring matter can be disposed inside the display.

In the tenth embodiment, the infrared ray absorbing coloring matter is arranged only at a photo-sensor section, whereby the light which is contained in external light and the spectrum of which is outside the spectrum of the light emitting section can be absorbed by the coloring matter and can therefore be prevented from being incident on the photo-sensors.

Thus, according to the seventh to tenth embodiments, the light in a spectrum other than the spectrum of the light emitting section is intercepted (reflected or absorbed), whereby the noise incident on the photo-sensors can be reduced. As a result, external light resistance performance is enhanced, and the display can be operated even in bright environments.

As has been described above, according to an embodiment, the liquid crystal display includes the plurality of display cells 21 each having the display circuit 210, the light receiving cells 22 each having the light receiving element 221, and the back light 26 operative to illuminate the display surface at a predetermined luminance.

The liquid crystal display has the first transparent substrate (TFT substrate) 23 which is disposed opposite to the back light 26 and which is provided with the cell circuits and the light receiving elements, and the second transparent substrate (opposite substrate) 24 disposed opposite to the TFT substrate 23.

Further, the liquid crystal display has: the liquid crystal layer 25 disposed between the TFT substrate 23 and the opposite substrate 24; the second polarizing plate 28 formed on a surface, facing the back light 26, of the TFT substrate 23;

and the antireflection layer 29 formed at the interface between the second polarizing plate 28 and the air layer 33.

Or, alternatively, the liquid crystal display has: the filler layer 30 which is disposed in place of the air layer and which has a refractive index of greater than 1; and the antireflection layer 32A formed at the interface between the front side of the transparent protective cover 31 and the air layer.

Or, the liquid crystal display has the antireflection layers 29C, 32C-1 and 32C-2 which are formed on the front side of the second polarizing plate 28 and at the interfaces between the transparent protective cover 31 and the air layer 33, respectively.

Therefore, according to an embodiment, the following effects can be obtained.

According to an embodiment, the reflected light generated from the most face-side surface of a photosensor-incorporating, inputting function-provided display can be eliminated, and the S/N can be improved.

In addition, an embodiment, the antireflection layer corresponding to the visible light region and the antireflection layer corresponding to the infrared region are respectively optimized, whereby the S/N can be enhanced.

Besides, even where a protective cover is disposed and adhered, elimination of the reflected light can be achieved also by subjecting the most face-side surface to an antireflection treatment.

Further, by intercepting (reflecting or absorbing) the light outside the spectrum of the light emitting section, the noise incident on the photo-sensors can be reduced. As a result, external light resistance performance is enhanced, and the display can be operated even in bright environments.

Figure 36:
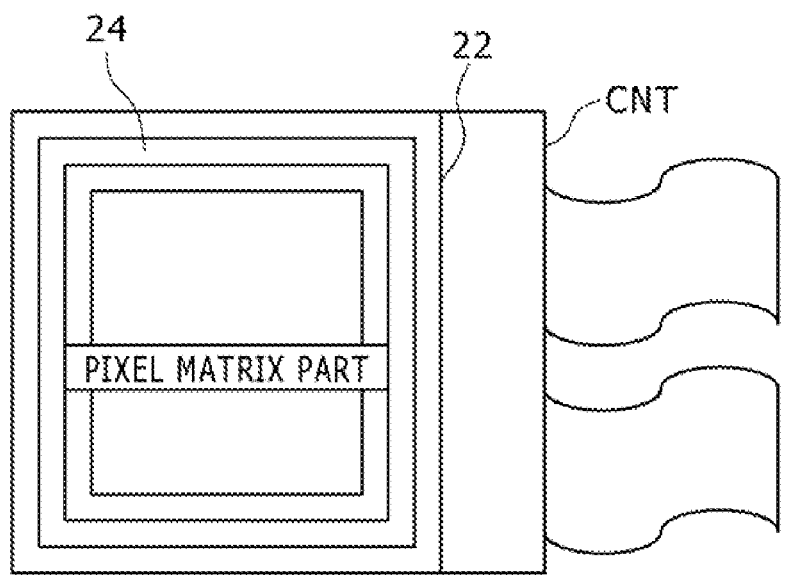
FIG. 36 is a schematic view showing an example of a flat type module shape.

The displays according to an embodiment include those of a flat module shape as shown in FIG. 36.

For example, a pixel array part in which pixels each including a liquid crystal element, a thin film transistor, a thin film capacitor, a light receiving element, etc. are stacked in a matrix form is provided on an insulating substrate 22, an adhesive is so disposed as to surround the pixel array part (pixel matrix part), and an opposite substrate of a glass or the like is adhered, to obtain a display module.

The transparent opposite substrate 24 may be provided with color filters, a protective film, a light intercepting film or the like, if necessary. The display module may be provided with, for example, an FPC (Flexible Printed Circuit) as a connector CNT for inputting/outputting signals or the like from the exterior to the pixel array part and vise versa.

The display according to an embodiment described above are applicable to displays in various electronic apparatuses shown in any field for displaying a picture signal inputted to the electronic apparatus or a picture signal produced in the electronic apparatus as an image or picture, for example, portable terminal devices (mobile apparatuses) such as digital camera, notebook size personal computer, mobile phone, etc., desktop type personal computer, video camera, etc., as shown in FIGS. 37 to 41G.

Now, examples of electronic apparatus in an embodiment are applied will be described below.

Figure 37:
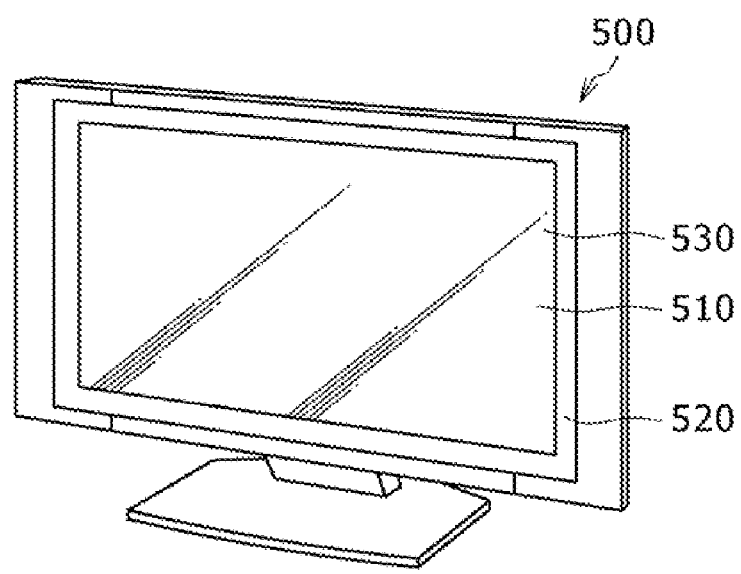
FIG. 37 is a perspective view of a television set according to an embodiment.

FIG. 37 is a perspective view of a television set according to an embodiment.

The television set 500 according to the present application example includes a picture display section 510 composed of a front panel 520, a filter glass 530, etc., and is manufactured by using the display according to the present embodiment as the picture display screen section 510 thereof.

Figure 38A:
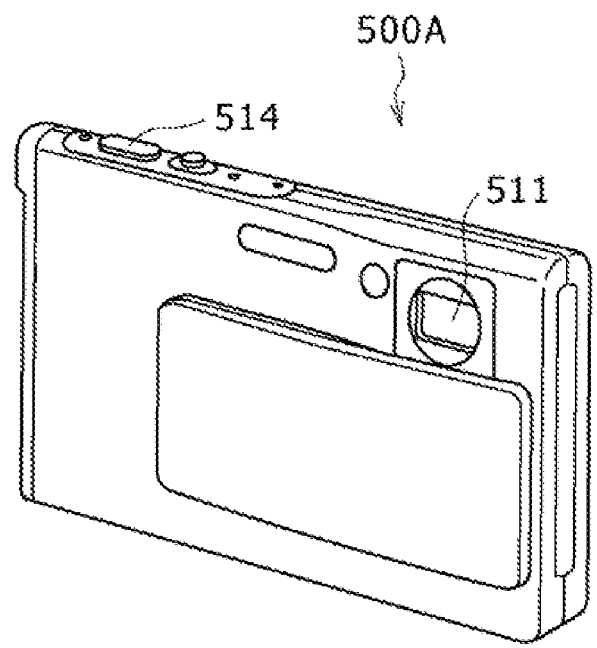
FIGS. 38A and 38B are perspective views of a digital camera according to an embodiment.
Figure 38B:
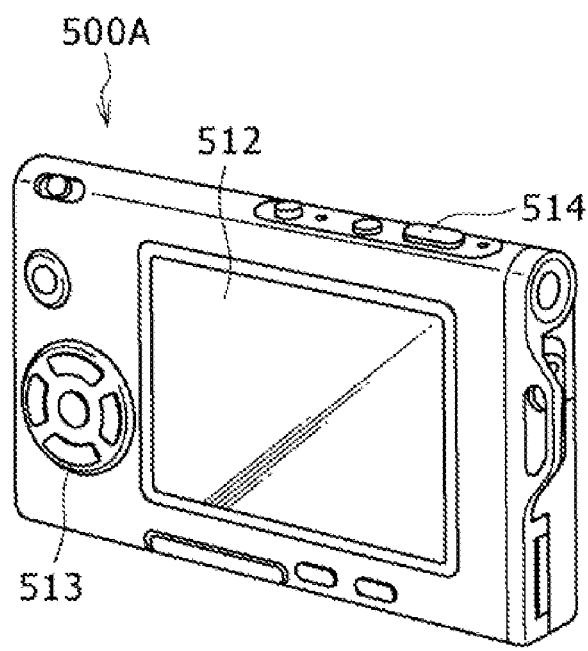

FIGS. 38A and 38B are perspective views of a digital camera to which the present embodiments are applicable, wherein FIG. 38A is a perspective view from the front side, and FIG. 38B is a perspective view from the back side.

The digital camera 500A according to an embodiment includes a flash light emitting section 511, a display section 512, a menu switch 513, a shutter button 514, etc., and is manufactured by using the display according to an embodiment as the display section 512 thereof.

Figure 39:
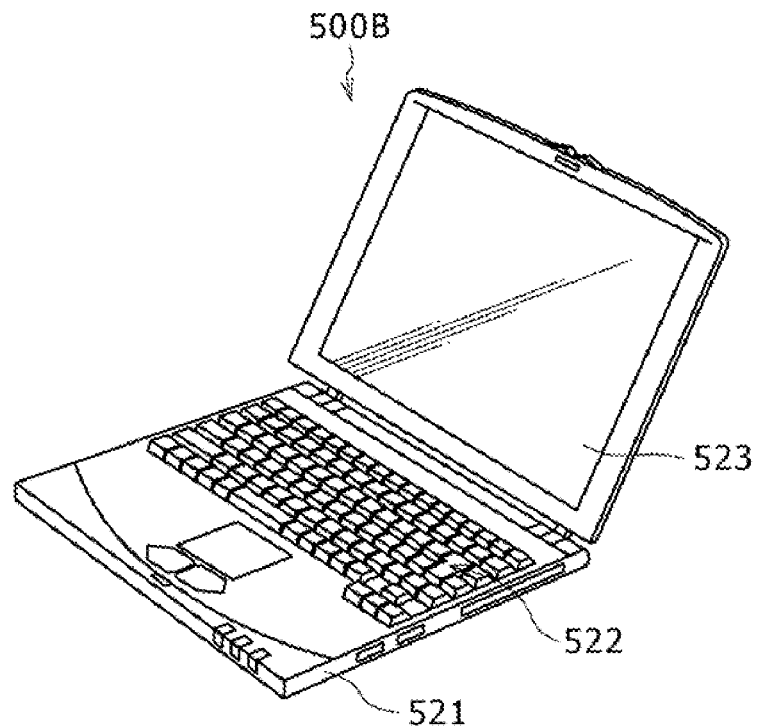
FIG. 39 is a perspective view of a notebook size personal computer according to an embodiment.

FIG. 39 is a perspective view of a notebook size personal computer according to an embodiment.

The notebook size personal computer 500B according to an embodiment includes a main body 521, a keyboard 522 operated to input characters or the like, a display section 523 for displaying images, etc., and is manufactured by using the display according to an embodiment as the display section 523 thereof.

Figure 40:
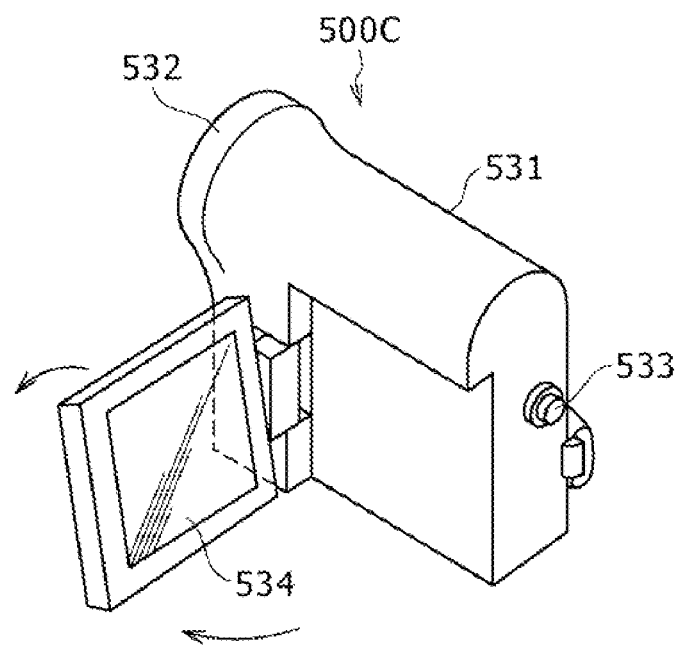
FIG. 40 is a perspective view of a video camera according to an embodiment.

FIG. 40 is a perspective view of a video camera according to an embodiment.

The video camera 500C according to the present application example includes a main body section 531, an object shooting lens 532 provided at a side surface facing forwards, a shooting start/stop switch 533, a display section 534, etc., and is manufactured by using the display according to an embodiment as the display section 534 thereof.

FIGS. 41A to 41G illustrate a portable terminal device, for example, a mobile phone to which the present embodiments are applicable, wherein FIG. 41A is a front view of the mobile phone in its opened state, FIG. 41B is a side view of the same, FIG. 41C is a front view of the mobile phone in its closed state, FIG. 41D is a left side view, FIG. 41E is a right side view, FIG. 41F is a top view, and FIG. 41G is a bottom view.

The mobile phone 500D according to an embodiment includes an upper-side casing 541, a lower-side casing 542, a connecting part (here, a hinge part) 543, a display 544, a sub-display 545, a picture light 546, a camera 547, etc., and is manufactured by using the display according to the present embodiment as the display 544 and/or the sub-display 545 thereof.

In addition, the displays according to an embodiment are applicable to the following display and imaging apparatus. Besides, the display and imaging apparatus is applicable to the above-mentioned various electronic apparatuses.

Figure 42:
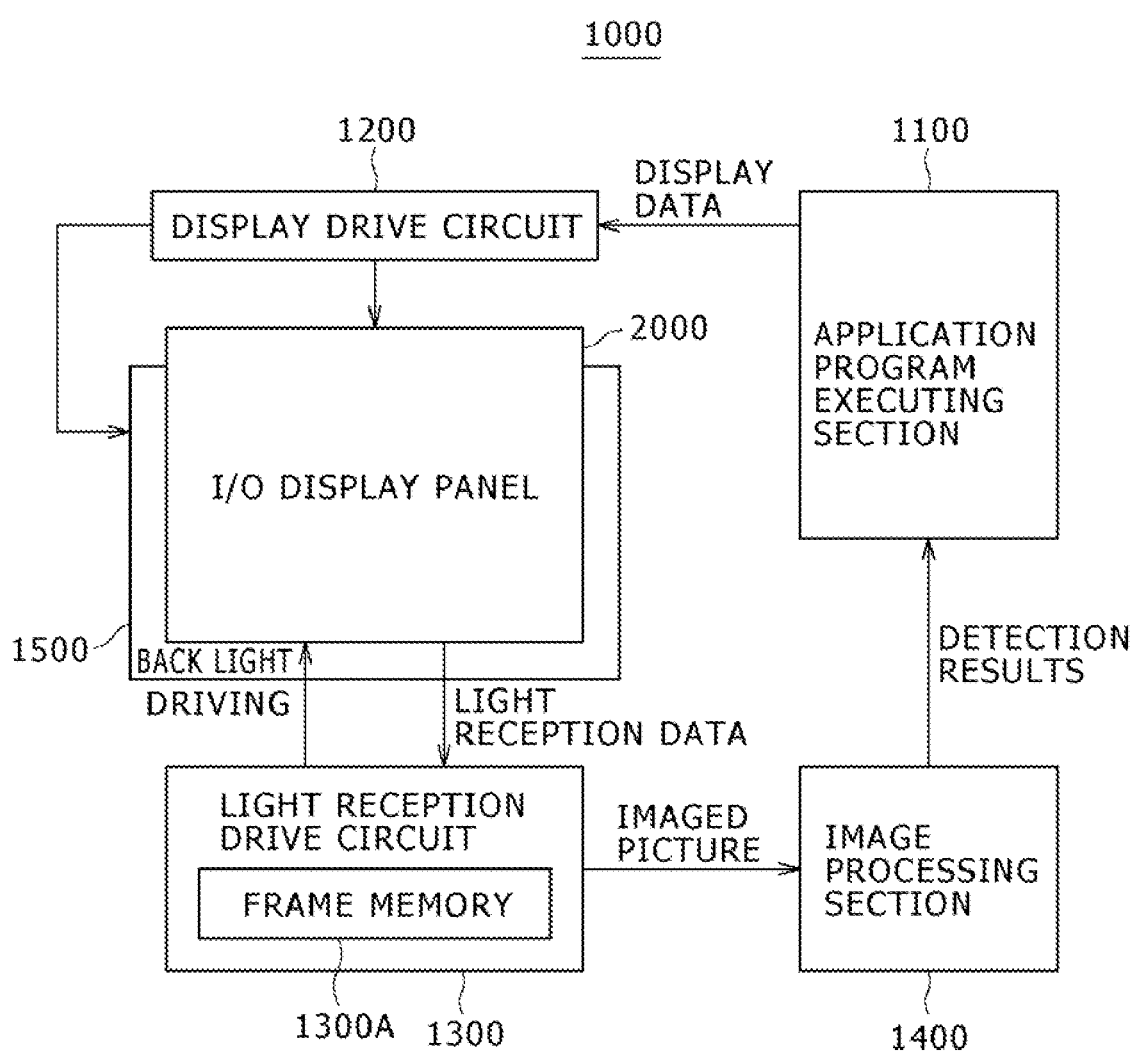
FIG. 42 is a block diagram showing the configuration of a display and imaging apparatus according to an embodiment.

FIG. 42 is a block diagram showing the general configuration of a display and imaging apparatus.

The display and imaging apparatus 1000 includes an I/O display panel 2000, a back light 1500, a display drive circuit 1200, a light reception drive circuit 1300, an image processing section 1400, and an application program executing section 1100.

The I/O display panel 2000 includes a liquid crystal panel (LCD (Liquid Crystal Display)) in which a plurality of pixels are arranged in a matrix pattern over the whole surface, has a function of displaying predetermined images such as figures and characters based on display data while performing a line-sequential operation (displaying function), and has a function of imaging an object coming into contact with or coming into proximity to the I/O display panel 2000 as will be described later (imaging function).

Besides, the back light 1500 is a light source for the I/O display panel 2000, including a plurality of light emitting diodes, and is so designed to perform high-speed ON/OFF operations at a timing synchronous to the operation timing of the I/O display panel 2000 as will be described later.

The display drive circuit 1200 is a circuit for driving the I/O display panel 2000 so that an image based on the display data is displayed on the I/O display panel 2000 (so as to perform a displaying operation) (a circuit for driving the line-sequential operation).

The light reception drive circuit 1300 is a circuit for driving the I/O display panel 2000 so that light reception data is obtained in the I/O display panel 2000 (so as to image an object) (a circuit for driving the line-sequential operation). Incidentally, the image reception data at each pixel is stored in a frame memory 1300A on a frame basis, for example, before being outputted to the image processing section 1400 as an imaged picture.

The image processing circuit 1400 performs a predetermined image processing (arithmetic process) based on the imaged picture outputted from the light reception drive circuit 1300, and detects and acquires information on an object coming into contact with or coming into proximity to the I/O display panel 2000 (positional coordinate data, data on the shape and/or size of the object, etc.). Incidentally, details of the detecting process will be described later.

The application program executing section 1100 executes a process according to a predetermined application software on the basis of the results of detection by the image processing section 1400, and examples thereof include an executing section in which positional coordinates of the object detected are contained in the display data, to be displayed on the I/O display panel 2000.

Incidentally, the display data produced in the application program executing section 1100 is supplied to the display drive circuit 1200.

Figure 43:
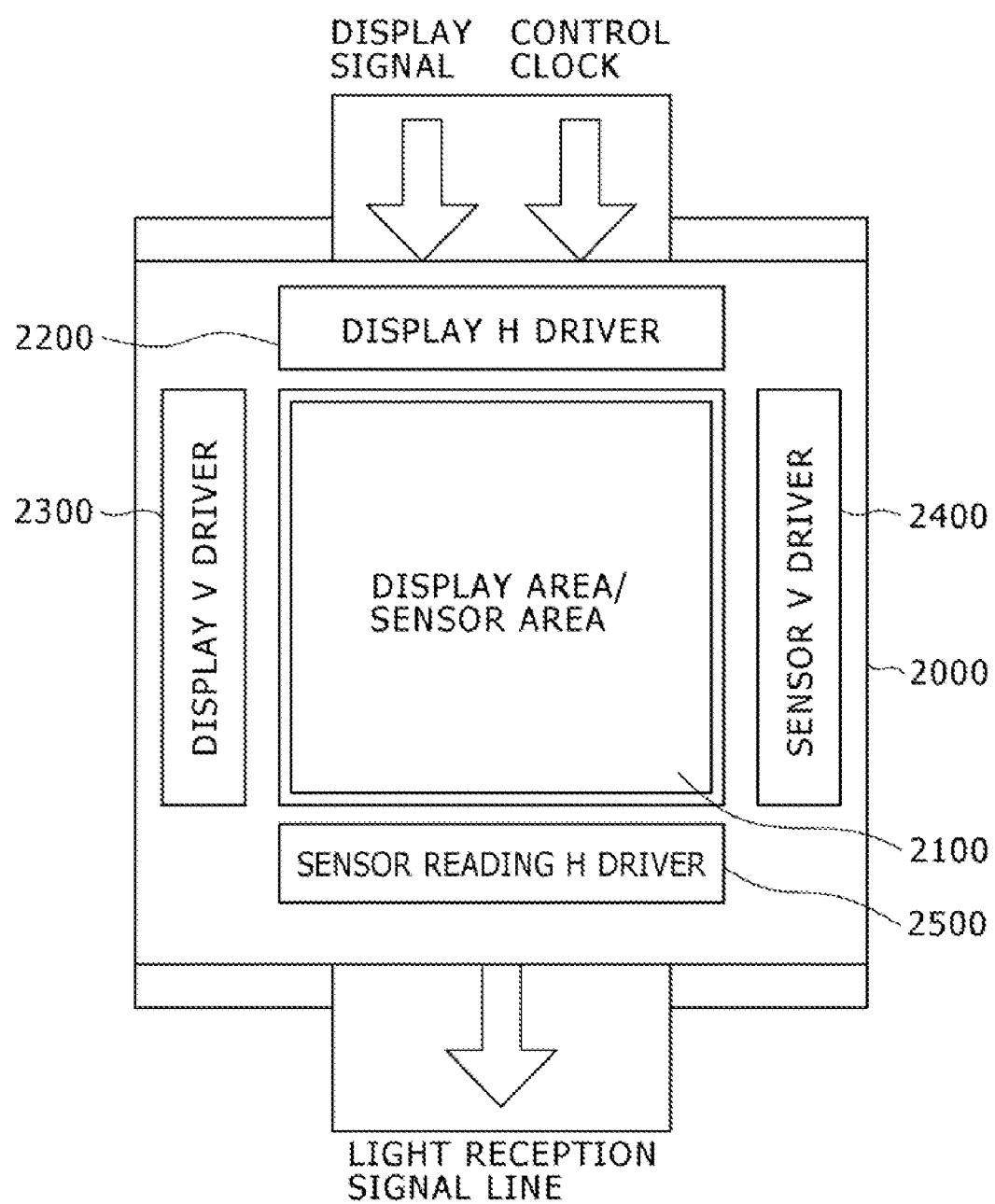
FIG. 43 is a block diagram showing a configuration example of the I/O display panel shown in FIG. 42.

Now, a detailed configuration example of the I/O display panel 2000 will be described below, referring to FIG. 43. The I/O display panel 2000 has a display area (sensor area) 2100, a display H driver 2200, a display V driver 2300, a sensor reading H driver 2500, and a sensor V driver 2400.

The display area (sensor area) 2100 is an area for emitting display light obtained by modulating the light from the back light 1500 and for imaging an object coming into contact with or coming into proximity to the area, and liquid crystal elements as light emitting elements (display elements) and light receiving elements (imaging elements) to be described later are arranged in the area in respective matrix patterns.

The display H driver 2200 drives the liquid crystal elements of the pixels in the display area 2100 on a line-sequential basis together with the display V driver 2300, based on a display signal and a control clock which are supplied from the display drive circuit 1200 for a display driving purpose.

The sensor reading H driver 2500 is operative to acquire a light reception signal by driving the light receiving elements of the pixels in the sensor area 2100 on a line-sequential basis together with the sensor V driver 2400.

Figure 44:
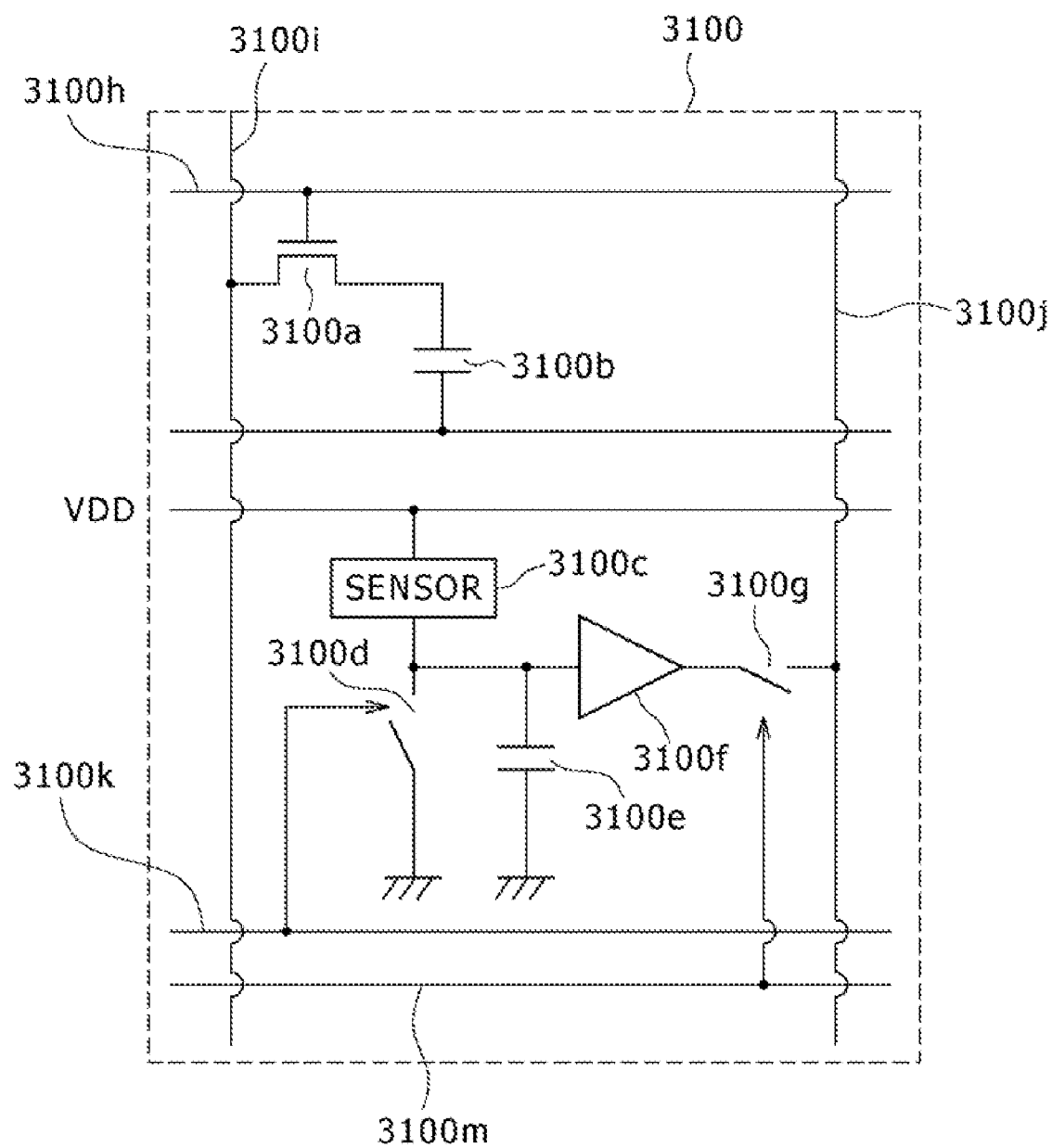
FIG. 44 is a circuit diagram showing a configuration example of each pixel.

Now, a detailed configuration example of each pixel in the display area 2100 will be described below, referring to FIG. 44. The pixel 3100 shown in FIG. 44 includes a liquid crystal element, which is a display element, and a light receiving element.

Specifically, on the display element side, a switching element 3100*a* composed of a thin film transistor (TFT) or the like is disposed at the intersection between a gate electrode 3100*h* extending in a horizontal direction and a drain electrode 3100*i* extending in the vertical direction, and a pixel electrode 3100*b* containing a liquid crystal is disposed between the switching element 3100*a* and an opposite electrode.

The switching element 3100*a* performs ON/OFF operations based on a driving signal supplied through the gate electrode 3100*h*. When the switching element 3100*a* is in the ON state, a pixel voltage is impressed on the pixel electrode 3100*b* on the basis of a display signal supplied through the drain electrode 3100*i*, whereby a display state is set.

On the other hand, on the side of the light receiving element adjacent to the display element, a light receiving sensor 3100*c* composed, for example, of a photo-diode or the like is disposed, and is supplied with a power source voltage VDD.

In addition, a reset switch 3100*d* and a capacitor 3100*e* are connected to the light receiving sensor 3100*c*, and, while resetting by the reset switch 3100*d* is conducted, an electric charge corresponding to the amount of light received is accumulated in the capacitor 3100*e*.

At the timing of turning-ON of the reading switch 3100*g*, the accumulated charge is supplied through a buffer amplifier 3100*f* to a signal outputting electrode 3100*j*, and is outputted to the exterior. In addition, the ON/OFF operations of the reset switch 3100*d* are controlled by a signal supplied by a reset electrode 3100*k*, whereas the ON/OFF operations of the reading switch 3100*g* are controlled by a signal supplied by a reading control electrode 3100*m*.

Figure 45:
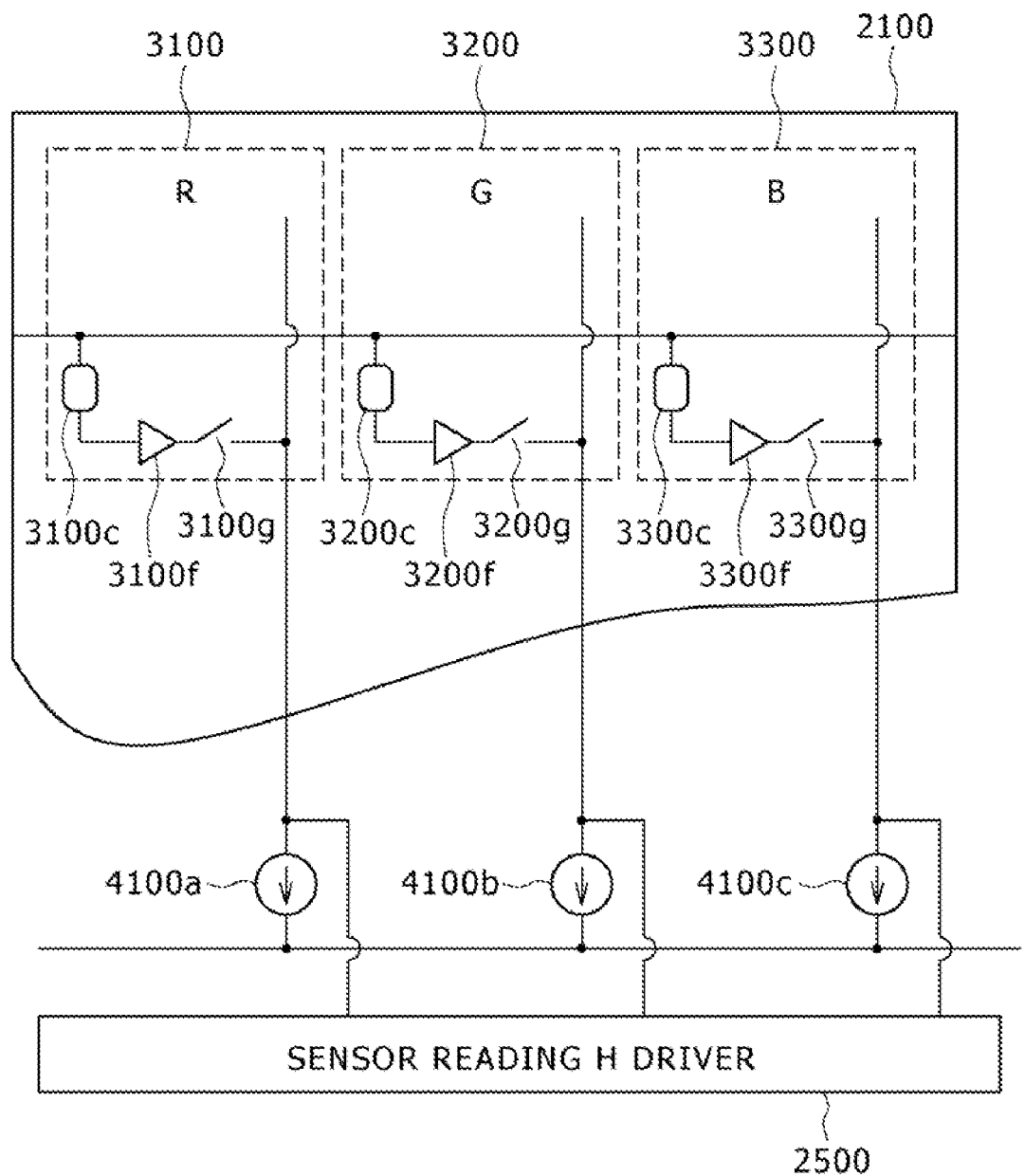
FIG. 45 is a circuit diagram for illustrating the connection relationship between each pixel and a sensor reading H driver.

Now, the connection relation between each pixel in the display area 2100 and the reading H driver 2500 will be described below, referring to FIG. 45. In the display area 2100, a red (R) pixel 3100, a green (G) pixel 3200, and a blue (B) pixel 3300 are arranged side by side.

Electric charges accumulated in capacitors connected to light emitting sensors 3100*c*, 3200*c*, 3300*c* of each pixel are amplified by respective buffer amplifiers 3100*f*, 3200*f*, 3300*f*, and are supplied to the sensor reading H driver 2500 through signal outputting electrodes at timings of turning-ON of the reading switches 3100*g*, 3200*g*, 3300*g*.

Incidentally, constant current sources 4100*a*, 4100*b*, 4100*c* are connected respectively to the signal outputting electrodes, and signals corresponding to the quantity of light received are detected with good sensitivity by the sensor reading H driver 2500.

Now, the operations of the display and imaging apparatus will be described in detail below.

First, basic operations of the display and imaging apparatus, specifically, an image displaying operation and an object imaging operation will be described.

In this display, based on display data supplied from the application program executing section 1100, a display driving signal is generated in the display drive circuit 1200, and the I/O display panel 2000 is driven by the driving signal to perform line-sequential display, whereby an image is displayed.

In this instance, the back light 1500 is also driven by the display drive circuit 1200 so as to perform turning-ON/OFF operations synchronous with the I/O display panel 2000.

Figure 46:
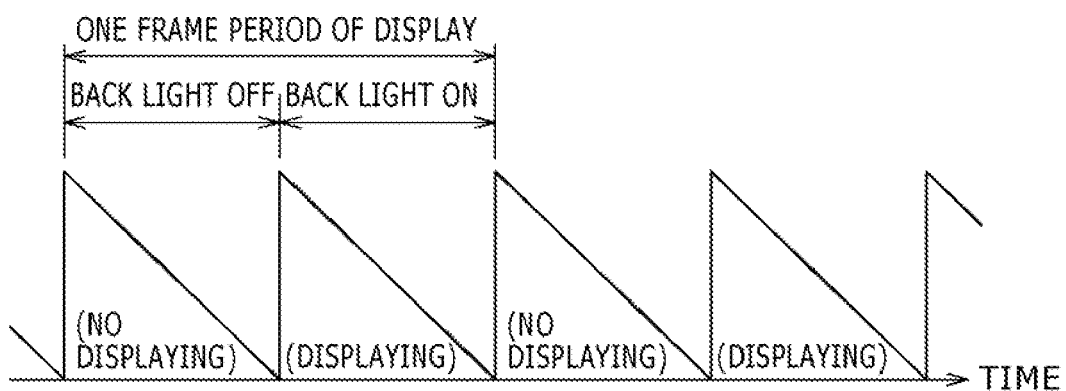
FIG. 46 is a timing chart for illustrating the relationship between the ON/OFF state of a back light and the display condition.

Here, referring to FIG. 46, the relation between the ON/OFF state of the back light 1500 and the display state of the I/O display panel 2000 will be described. In FIG. 46, time is taken on the axis of abscissas, and the positions in the vertical direction of the rows scanned for imaging, of the light receiving elements of the pixels, are taken on the axis of ordinates.

First, in the case where image display is conducted with a frame period of 1/60 sec, for example, the back light 1500 is kept OFF (kept in the OFF state) for the former half period (1/120 sec) of each frame period, so that no display is made. On the other hand, for the latter half period of each frame period, the back light 1500 is kept ON (kept in the ON state), whereby display signals are supplied to the pixels, and an image for the frame period is displayed.

Thus, the former half period of each frame period is a no-light period in which no display light is emitted from the I/O display panel 2000; on the other hand, the latter half period of each frame period is a light-present period for which the display light is emitted from the I/O display panel 2000.

Here, when an object (for example, a fingertip or the like) coming into contact with or coming into proximity to the I/O display panel 2000 is present, the object is imaged by the light receiving elements of the pixels in the I/O display panel 2000 through the line-sequential light reception driving by the light reception drive circuit 1300 in the no-light period and the light-present period, and light reception signals from the light receiving elements are supplied to the light reception drive circuit 1300. In the light reception drive circuit 1300, light reception signals from the pixels in an amount corresponding to one frame are accumulated, to be outputted to the image processing section 1400 as an imaged picture.

Then, in the image processing section 1400, a predetermined image processing (arithmetic process) is conducted based on the imaged picture, whereby information on the object coming into contact with or coming into proximity to the I/O display panel 2000 (positional coordinate data, data on the shape and size of the object, etc.) is detected.

For example, by determining the differences in a picture imaged in the no-light period (OFF period) and a picture imaged in the light-present period (ON period), it is possible to remove external light and to obtain picture information based on the light emitted from the back light 1500 and reflected by the object coming into contact with or coming into proximity to the I/O display panel 2000 in the light-present period. From the picture information, data reaching or exceeding a predetermined threshold are extracted and digitized (converted into a binary variable), followed by image processing for determining the coordinates of the center of gravity, etc., whereby information on the object coming into contact with or into proximity to the I/O display panel 2000 can be obtained.

Besides, in the case where infrared light for detection is outputted from the back light 1500 together with visible light, a method may be adopted in which the infrared light component is turned ON and OFF, whereas the visible light component is normally turned ON.

The present application is applicable not only to LCDs but also to other types of displays such as other types of organic EL displays and electronic papers (E-papers).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display comprising:
   at least one display cell having a display circuit;
   at least one light receiving cell including a light receiving element;
   a light emitting section operative to radiate light to the side of a display surface; and
   at least one transparent plate disposed on the front side in said display relative to a region in which said light emitting section is disposed and regions in which said display cell and said light receiving cell are formed;
   a polarizing plate formed on a face-side surface of the at least one transparent plate; and
   an antireflection layer formed directly on the polarizing late constituting a most face-side surface of said display.

2. The display as set forth in claim 1,
   wherein said antireflection layer has a function of preventing reflection of light in a wavelength region in which the spectrum of said light emitting section is present.

3. The display as set forth in claim 2,
   wherein said antireflection layer includes a function of preventing incidence of light in a wavelength region in which the spectrum of said light emitting section is absent.

4. The display as set forth in claim 2,
   wherein a filter operative to prevent incidence of light in a wavelength region in which the spectrum of detection light used for detection by said light receiving element is absent, of the light emitted from said light emitting section, is disposed in said display.

5. A display device comprising:
   a display including:
   (a) at least one display cell having a display circuit;
   (b) at least one light receiving cell including a light receiving element;
   (c) a light emitting section operative to radiate light to the side of a display surface;
   (d) at least one transparent plate disposed on the front side in said display device relative to a region in which said light emitting section is disposed and regions in which said display cell and said light receiving cell are formed; and
   (e) a first antireflection layer formed on a most face-side surface of said display;
   a protective transparent substrate disposed on a further front side of the display device relative to the display;
   an air layer between the display and the protective transparent substrate; and
   a second antireflection layer provided on both of a front-side surface and a back-side surface of said protective transparent substrate.

6. The display device as set forth in claim 5,
   wherein said first and second antireflection layers have a function of preventing reflection of light in a wavelength region in which the spectrum of said light emitting section is present.

7. The display device as set forth in claim 6,
   wherein said first and second antireflection layers include a function of preventing incidence of light in a wavelength region in which the spectrum of said light emitting section is absent.

8. The display device as set forth in claim 6,
   wherein a filter operative to prevent incidence of light in a wavelength region in which the spectrum of detection light used for detection by said light receiving element is absent, of the light emitted from said light emitting section, is disposed in said display.

9. A display comprising:
   at least one display cell having a display circuit;
   at least one light receiving cell including a light receiving element;
   a back light operative to illuminate a display surface at a predetermined luminance;
   a first transparent substrate provided with said display cell and said light receiving element;
   a second transparent substrate disposed opposite to said first transparent substrate;
   a liquid crystal layer disposed between said first transparent substrate and said second transparent substrate;
   a first polarizing plate formed on a surface, opposed to said back light, of said first transparent substrate; and
   a second polarizing plate formed on the front side of said second transparent substrate,
   wherein an antireflection layer is formed directly on said second polarizing plate constituting a most face-side surface of said display.

10. The display as set forth in claim 9,
wherein said antireflection layer has a function of preventing reflection of light in a wavelength region in which the spectrum of said light emitting section is present.

11. An electronic apparatus comprising a display,
said display including:
at least one display cell having a display circuit;
at least one light receiving cell including a light receiving element;
a light emitting section operative to illuminate the side of a display surface; and
at least one transparent plate disposed on the front side in said display relative to a region in which said light emitting section is disposed and regions in which said display cell and said light receiving cell are formed;
a polarizing plate fanned on a face-side surface of the at least one transparent plate; and
an antireflection layer formed directly on the polarizing plate constituting a most face-side surface of said display.

12. An electronic apparatus comprising a display,
said display including:
at least one display cell having a display circuit;
at least one light emitting section including a light emitting element;
a back light operative to illuminate a display surface at a predetermined luminance;
a first transparent substrate provided with said display cell and said light emitting element;
a second transparent substrate disposed opposite to said first transparent substrate;
a liquid crystal layer disposed between said first transparent substrate and said second transparent substrate;
a first polarizing plate formed on a surface, opposed to said back light, of said first transparent substrate; and
a second polarizing plate formed on the front side of said second transparent substrate,
wherein an antireflection layer is formed directly on said second polarizing plate constituting a most face-side surface of said display.

13. The display as set forth in claim 1, wherein the light emitting section is configured to radiate light in an infrared region, and wherein
the antireflection layer is configured to limit reflection of light in the infrared region.

14. The display as set forth in claim 13, wherein the antireflection layer is configured to limit reflection of light with a wavelength greater than 780 nm.

15. The display as set forth in claim 1, wherein the light emitting section is configured to radiate light in an infrared region, and
wherein the antireflection layer has a monolayer structure including $MgF_2$.

16. The display as set forth in claim 1, wherein the light emitting section is configured to radiate light in a visible region, and
wherein the antireflection layer has a multilayer structure including a layer of $TiO_2$ between two layers of $SiO_2$.

17. A display device comprising:
a display including:
(a) at least one display cell having a display circuit;
(b) at least one light receiving cell including a light receiving element;
(c) a back light operative to illuminate a display surface at a predetermined luminance;
(d) a first transparent substrate provided with said display cell and said light receiving element;
(e) a second transparent substrate disposed opposite to said first transparent substrate;
(f) a liquid crystal layer disposed between said first transparent substrate and said second transparent substrate;
(g) a first polarizing plate formed on a surface, opposed to said back light, of said first transparent substrate; and
(h) a second polarizing plate formed on the front side of said second transparent substrate,
a protective transparent substrate disposed on a further front side of the display device relative to the display;
an air layer between the display and the protective transparent substrate; and
a second antireflection layer provided on both of a front-side surface and a back-side surface of said protective transparent substrate.

18. The display device as set forth in claim 17,
wherein said first and second antireflection layers have a function of preventing reflection of light in a wavelength region in which the spectrum of said light emitting section is present.

* * * * *